United States Patent
Hatakeyama et al.

(10) Patent No.: US 11,441,940 B2
(45) Date of Patent: Sep. 13, 2022

(54) CONDITION MONITORING APPARATUS, CONDITION MONITORING SYSTEM, AND CONDITION MONITORING METHOD

(71) Applicant: NTN CORPORATION, Osaka (JP)

(72) Inventors: Wataru Hatakeyama, Kuwana (JP); Makoto Miyazaki, Kuwana (JP); Takashi Haseba, Kuwana (JP); Yosuke Suzuki, Kuwana (JP)

(73) Assignee: NTN CORPORATION, Osaka (JP)

( * ) Notice: Subject to any disclaimer, the term of this patent is extended or adjusted under 35 U.S.C. 154(b) by 199 days.

(21) Appl. No.: 16/604,952

(22) PCT Filed: Apr. 4, 2018

(86) PCT No.: PCT/JP2018/014381
§ 371 (c)(1),
(2) Date: Oct. 11, 2019

(87) PCT Pub. No.: WO2018/190216
PCT Pub. Date: Oct. 18, 2018

(65) Prior Publication Data
US 2020/0158562 A1     May 21, 2020

(30) Foreign Application Priority Data

Apr. 13, 2017 (JP) .............................. JP2017-079556
Apr. 13, 2017 (JP) .............................. JP2017-079695
(Continued)

(51) Int. Cl.
*G01H 1/00* (2006.01)
*G01M 13/028* (2019.01)
(Continued)

(52) U.S. Cl.
CPC ............... *G01H 1/003* (2013.01); *G01H 3/08* (2013.01); *G01M 13/028* (2013.01); *G01P 7/00* (2013.01); *F05B 2270/334* (2013.01)

(58) Field of Classification Search
CPC ....... G01H 1/003; G01H 3/08; G01M 13/028; G01M 13/045; G01M 99/00; G01P 7/00; F05B 2270/334
(Continued)

(56) References Cited

U.S. PATENT DOCUMENTS

2003/0014219 A1   1/2003   Shimizu et al.
2003/0066352 A1   4/2003   Leamy et al.
(Continued)

FOREIGN PATENT DOCUMENTS

JP   H01-152335 A   6/1989
JP   H03-18739 A    1/1991
(Continued)

OTHER PUBLICATIONS

English translation of Komai, JP 2016-083759, May 16, 2016. (Year: 2016).*
(Continued)

*Primary Examiner* — Michael P Nghiem
(74) *Attorney, Agent, or Firm* — McDermott Will & Emery LLP

(57) ABSTRACT

A data processing device includes a peak detector that detects a peak from a frequency spectrum and a map generator that generates an abnormality map for the frequency spectrum. The abnormality map includes as abnormal components, a frequency of a detected peak of interest and a frequency of a peak that appears together with the peak of interest when the peak of interest is assumed as the peak originating from abnormality. The data processing device includes an abnormal peak extractor that extracts as an
(Continued)

abnormal peak, a peak at a frequency that matches with any of the abnormal components included in the abnormality map and a first criterion value calculator that calculates a first criterion value representing occurrence of abnormality corresponding to the abnormality map based on a spectral density of the abnormal peak.

20 Claims, 30 Drawing Sheets

(30) Foreign Application Priority Data

Apr. 13, 2017 (JP) .............................. JP2017-079696
Mar. 29, 2018 (JP) .............................. JP2018-064000

(51) Int. Cl.
*G01P 7/00* (2006.01)
*G01H 3/08* (2006.01)

(58) Field of Classification Search
USPC .......................................................... 702/56
See application file for complete search history.

(56) References Cited

U.S. PATENT DOCUMENTS

| | | | |
|---|---|---|---|
| 2010/0145639 A1 | 6/2010 | Fu et al. | |
| 2010/0179722 A1 | 7/2010 | Suetsugu et al. | |
| 2012/0278663 A1* | 11/2012 | Hasegawa | G06F 11/079 714/47.1 |
| 2013/0096848 A1 | 4/2013 | Hatch et al. | |
| 2015/0116131 A1 | 4/2015 | Ikeda et al. | |
| 2017/0096986 A1 | 4/2017 | Takeuchi et al. | |
| 2017/0108407 A1 | 4/2017 | Takada et al. | |
| 2018/0224324 A1 | 8/2018 | Ikeda et al. | |

FOREIGN PATENT DOCUMENTS

| | | |
|---|---|---|
| JP | 2001-255241 A | 9/2001 |
| JP | 2009-020090 A | 1/2009 |
| JP | 2010-160112 A | 7/2010 |
| JP | 2011-259624 A | 12/2011 |
| JP | 2012-088671 A | 5/2012 |
| JP | 2013-185507 A | 9/2013 |
| JP | 2015-183628 A | 10/2015 |
| JP | 2015-203393 A | 11/2015 |
| JP | 2016-024007 A | 2/2016 |
| JP | 2016-083759 A | 5/2016 |
| JP | 2017-026514 A | 2/2017 |
| JP | 2017-150884 A | 8/2017 |
| WO | 2009/096551 A1 | 8/2009 |

OTHER PUBLICATIONS

English translation of Konishi et al., JP H0318739, Jan. 28, 1991. (Year: 1991).*
English translation of Konishi et al., JP 2012086671, Jan. 28, 1991. (Year: 1991).*
John Dempster, "Power Spectral Density", The Laboratory Computer, 2001. p. 1. (Year: 2001).*
Japanese Office Action issued in corresponding Japanese Patent Application No. 2017-073695, dated Jan. 26, 2021, with English translation.
Japanese Office Action issued in carresponding Japanese Patent Application No. 2017-079696, dated Jan. 26, 2021, with English translation.
International Search Report issued in corresponding International Patent Application No. PCT/JP2018/014381, dated Jul. 3, 2018, with English translation.
Extended European Search Report issued in corresponding European Patent Application No. 18784436.0, dated Mar. 29, 2021.
Partial European Supplemental Search Report issued in corresponding European Patent Application No. 18784436.0, dated Dec. 11, 2020.

* cited by examiner

TIME

TIME

FREQUENCY

FIG.12

| MODEL OF ABNORMALITY MAP | FREQUENCY OF SENSED PEAK | FIRST CRITERION VALUE |
|---|---|---|
| 1 | 10.8 | 100 |
| | 37.2 | 500 |
| | 87.9 | 350 |
| | 191.6 | 12 |
| | ⋮ | ⋮ |
| 2 | 10.8 | 3 |
| | 37.2 | 2 |
| | 87.9 | 3 |
| | 191.6 | 925 |
| | ⋮ | ⋮ |

FIG.13

| PART INFORMATION | MODEL INFORMATION | FUNDAMENTAL FREQUENCY | SECOND THRESHOLD VALUE |
|---|---|---|---|
| OUTER RING OF BEARING | 1 | 37.2 | 100 |
| INNER RING OF BEARING | 2 | 52.8 | 150 |
| GEAR TOOTH | 2 | 60.1 | 500 |

FIG.14

| PART INFORMATION | MODEL INFORMATION | FUNDAMENTAL FREQUENCY | FIRST CRITERION VALUE |
|---|---|---|---|
| OUTER RING OF BEARING | 1 | 37.2 | 500 |
| UNKNOWN | 1 | 87.9 | 350 |
| UNKNOWN | 2 | 191.6 | 925 |

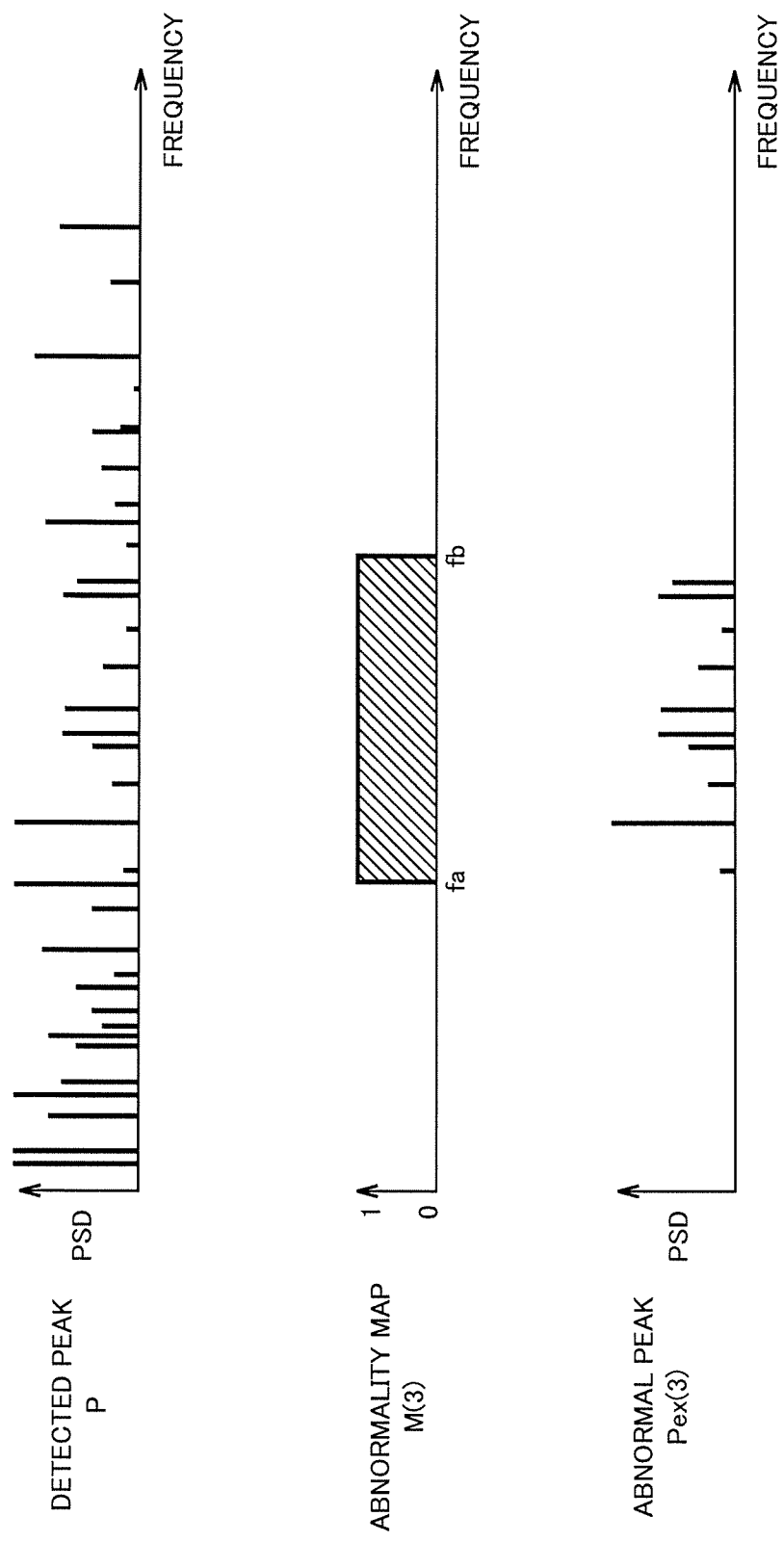

FIG.18

(a) RESULT OF CALCULATION OF CRITERION VALUE

| MODEL OF ABNORMALITY MAP | FREQUENCY OR BAND OF SENSED PEAK | FIRST CRITERION VALUE |
|---|---|---|
| 1 | 10.8 | 100 |
|   | 37.2 | 500 |
|   | 87.9 | 350 |
|   | 191.6 | 12 |
|   | ... | ... |
| 2 | 10.8 | 3 |
|   | 37.2 | 2 |
|   | 87.9 | 3 |
|   | 191.6 | 925 |
|   | ... | ... |
| 3 | 100~200 | 600 |
|   | 200~500 | 150 |

(b) ABNORMAL PART INFORMATION IN DATABASE

| PART INFORMATION | MODEL INFORMATION | FUNDAMENTAL FREQUENCY OR BAND | SECOND THRESHOLD VALUE |
|---|---|---|---|
| OUTER RING OF BEARING | 1 | 37.2 | 100 |
| INNER RING OF BEARING | 2 | 52.8 | 150 |
| GEAR TOOTH | 2 | 60.1 | 500 |
| BEARING WEAR A | 3 | 100~200 | 300 |
| BEARING WEAR B | 3 | 200~500 | 900 |

(c) RESULT OF ESTIMATION OF ABNORMAL PART

| PART INFORMATION | MODEL INFORMATION | FUNDAMENTAL FREQUENCY OR BAND | FIRST CRITERION VALUE |
|---|---|---|---|
| OUTER RING OF BEARING | 1 | 37.2 | 500 |
| BEARING WEAR A | 3 | 100~200 | 600 |
| UNKNOWN | 1 | 87.9 | 350 |
| UNKNOWN | 2 | 191.6 | 925 |

CONDITION MONITORING APPARATUS, CONDITION MONITORING SYSTEM, AND CONDITION MONITORING METHOD

CROSS-REFERENCE TO RELATED APPLICATIONS

This application is the U.S. National Phase under 35 U.S.C. § 371 of International Application No. PCT/JP2018/014381, filed on Apr. 4, 2018, which claims the benefit of Japanese Application No. 2018-064000, filed Mar. 29, 2018, Japanese Application No. 2017-079696, filed Apr. 13, 2017, Japanese Application No. 2017-079695, filed Apr. 13, 2017, and Japanese Application No. 2017-079556, filed Apr. 13, 2017, the entire contents of each are hereby incorporated by reference.

TECHNICAL FIELD

The present invention relates to a condition monitoring apparatus that monitors a condition of an object, a condition monitoring system, and a condition monitoring method.

BACKGROUND ART

A condition monitoring apparatus that diagnoses abnormality of a machine for early detection of abnormality of the machine and maintenance of the machine has conventionally been known. For example, Japanese Patent Laying-Open No. 2009-20090 (PTL 1) discloses a technique to diagnose whether or not there is abnormality by extracting a frequency component corresponding to a theoretical value of an abnormal frequency of vibration originating from abnormality of a rotating portion from frequency components of vibration signals generated from the rotating portion of mechanical facilities. The theoretical value of the abnormal frequency is calculated in advance in accordance with a prescribed relational expression.

CITATION LIST

Patent Literature

PTL 1: Japanese Patent Laying-Open No. 2009-20090
PTL 2: Japanese Patent Laying-Open No. 2013-185507
PTL 3: Japanese Patent Laying-Open No. 2015-183628
PTL 4: Japanese Patent Laying-Open No. 2017-26514

SUMMARY OF INVENTION

Technical Problem

According to the conventional technique as above, where or not there is abnormality is diagnosed based on the frequency component corresponding to the theoretical value of the abnormal frequency calculated in advance. When the frequency component corresponding to the theoretical value of the abnormal frequency contains noise, however, abnormality may erroneously be detected. An actual abnormal frequency may deviate from the theoretical value due to influence by tolerance or accuracy in assembly of a machine to be subjected to condition monitoring.

When a rotating machine is to be subjected to condition monitoring, the actual abnormal frequency may deviate from the theoretical value also due to variation in rotation speed during measurement of vibration data. In such a case, abnormality cannot accurately be detected.

The theoretical value of the abnormal frequency is calculated in advance with abnormality of a specific part of a rotating component to be subjected to condition monitoring being adopted as a model. Therefore, occurrence of abnormality of which origin is unknown cannot be detected.

The present invention was made to solve the problems above, and an object thereof is to provide a condition monitoring apparatus, a condition monitoring system, and a condition monitoring method capable of calculating a criterion value for accurate determination as to whether there is abnormality in an object.

Solution to Problem

The present disclosure relates to a condition monitoring apparatus that monitors a condition of an object. The condition monitoring apparatus includes a peak detector that detects a peak from a frequency spectrum obtained by frequency analysis of waveform data measured by a sensor provided in the object and a map generator that generates at least one abnormality map for the frequency spectrum. The at least one abnormality map includes as abnormal components, a frequency of one peak of interest selected from among detected peaks and a frequency of a peak that appears together with the peak of interest when the peak of interest is assumed as a peak originating from abnormality of the object. The condition monitoring apparatus further includes an abnormal peak extractor that selects one map of interest from among the at least one abnormality map and extracts as an abnormal peak from the detected peaks, a peak of which frequency difference from any of the abnormal components included in the map of interest is equal to or smaller than a prescribed value and a first criterion value calculator that calculates a first criterion value representing occurrence of abnormality corresponding to the map of interest based on a spectral density of the abnormal peak.

Preferably, the frequency spectrum is expressed by a data sequence in which unit data where a frequency and a spectral density at the frequency are brought in correspondence with each other are arranged sequentially in accordance with the frequency. The peak detector detects as a peak from the data sequence, unit data having a spectral density exhibiting a relative maximum value and exceeding a first threshold value.

Preferably, the peak detector sets based on the frequency spectrum, the first threshold value that is constant regardless of the frequency. Alternatively, the peak detector may set based on the frequency spectrum, the first threshold value varied in accordance with the frequency.

Preferably, the at least one abnormality map includes at least one of a first abnormality map, a second abnormality map, and a third abnormality map, in the first abnormality map, with a frequency of the peak of interest being defined as a fundamental frequency, the fundamental frequency and a frequency of a harmonic of a fundamental wave having the fundamental frequency are defined as abnormal components, in the second abnormality map, the fundamental frequency, a frequency of a sideband wave of the fundamental wave, a frequency of the harmonic, and a frequency of a sideband wave of the harmonic are defined as abnormal components, and in the third abnormality map, a frequency included in a prescribed frequency band including the frequency of the peak of interest is defined as an abnormal component.

Preferably, the at least one abnormality map includes information where the frequency and a value 0 or 1 are brought in correspondence with each other for each frequency, a value corresponding to a frequency defined as the abnormal component is set to 1, and a value corresponding to a frequency not defined as the abnormal component is set to 0. The abnormal peak extractor extracts the abnormal peak by subjecting the unit data detected as the peak by the peak detector and the map of interest to AND processing and masking a peak at a frequency not defined as the abnormal component.

Preferably, the first criterion value is a sum of spectral densities of the abnormal peaks. Alternatively, the first criterion value is a sum of values obtained by multiplying the spectral density of the abnormal peak by a weight coefficient in accordance with the frequency of the abnormal peak.

Preferably, the condition monitoring apparatus further includes an abnormal part estimator that extracts abnormal part information as identification information from a database, the database storing, for each part of the object, the abnormal part information in which part information for identifying the part, a frequency originating from abnormality of the part, and a second threshold value are brought in correspondence with one another, the identification information representing the frequency of which difference from the peak of interest corresponding to the map of interest is equal to or smaller than a prescribed value and representing the second threshold value smaller than the first criterion value corresponding to the map of interest, the abnormal part estimator generating first estimation result information indicating that abnormality has occurred in a part identified by the part information in the identification information.

Alternatively, the at least one abnormality map may include two or more abnormality maps generated for the peak of interest based on two or more abnormality models different from each other in how an abnormal component appears. The condition monitoring apparatus further includes an abnormal part estimator that extracts abnormal part information as identification information from a database, the database storing, for each part of the object, the abnormal part information in which model information for identifying an abnormality model, part information for identifying the part, a frequency originating from abnormality of the part, and a second threshold value are brought in correspondence with one another, the identification information representing the model information for identifying the abnormality model corresponding to the map of interest, representing the frequency of which difference from the peak of interest corresponding to the map of interest is equal to or smaller than a prescribed value, and representing the second threshold value smaller than the first criterion value corresponding to the map of interest, the abnormal part estimator generating first estimation result information indicating that abnormality has occurred in a part identified by the part information in the identification information.

Preferably, the abnormal part estimator generates, when the abnormal part estimator is unable to extract the identification information for the map of interest and the first criterion value corresponding to the map of interest exceeds a third threshold value, second estimation result information indicating that abnormality not registered in the database has occurred.

Preferably, the at least one abnormality map includes a plurality of abnormality maps. The first criterion value calculator selects each of the plurality of abnormality maps sequentially as the map of interest and calculates the first criterion value for each of the plurality of abnormality maps. The condition monitoring apparatus further includes a second criterion value calculator that calculates as a second criterion value, a sum of the first criterion values in the map of interest for which identification information has been extracted by the abnormal part estimator. Alternatively, the condition monitoring apparatus may further include a second criterion value calculator that calculates as a second criterion value, a sum of the first criterion value in the map of interest for which identification information has been extracted by the abnormal part estimator and the first criterion value in the map of interest for which identification information has not been extracted and in which the corresponding first criterion value exceeds the third threshold value.

A system according to another aspect of the present disclosure is directed to a condition monitoring system including the condition monitoring apparatus described above and a terminal device. The terminal device shows a graph of the frequency spectrum on a display.

Preferably, the terminal device shows a portion of the abnormal peak in the frequency spectrum corresponding to an abnormality map selected from the at least one abnormality map in a display format different from a display format for a remaining portion.

Preferably, the terminal device removes the abnormal peak in the frequency spectrum corresponding to an abnormality map selected from the at least one abnormality map.

Preferably, the terminal device shows only the abnormal peak in the frequency spectrum corresponding to an abnormality map selected from the at least one abnormality map.

A method according to another aspect of the present disclosure is a condition monitoring method of monitoring a condition of an object. The condition monitoring method includes detecting a peak from a frequency spectrum obtained by frequency analysis of waveform data measured by a sensor provided in the object and generating at least one abnormality map for the frequency spectrum. The condition monitoring method further includes selecting one map of interest from among the at least one abnormality map and extracting as an abnormal peak from detected peaks, a peak of which frequency difference from any of abnormal components included in the map of interest is equal to or smaller than a prescribed value and calculating a first criterion value representing occurrence of abnormality corresponding to the map of interest based on a spectral density of the abnormal peak.

Advantageous Effects of Invention

According to the condition monitoring apparatus or the condition monitoring method of the present invention, a criterion value for accurately determining whether or not there is abnormality in an object can be calculated.

BRIEF DESCRIPTION OF DRAWINGS

FIG. 12 is a diagram showing an exemplary first criterion value calculated by a first criterion value calculator shown in FIG. 2.

FIG. 13 is a diagram showing exemplary abnormal part information stored in a database shown in FIG. 2.

FIG. 14 is a diagram showing exemplary estimation result information generated by an abnormal part estimator shown in FIG. 2.

FIG. 17 is a diagram showing relation among a detected peak, a third abnormality map, and an abnormal peak.

FIG. 18 is a diagram showing an example of a result of calculation of the first criterion value, abnormal part information stored in the database, and estimation result information when abnormality in accordance with first to third abnormality models may occur in an object.

DESCRIPTION OF EMBODIMENTS

Figure 1:
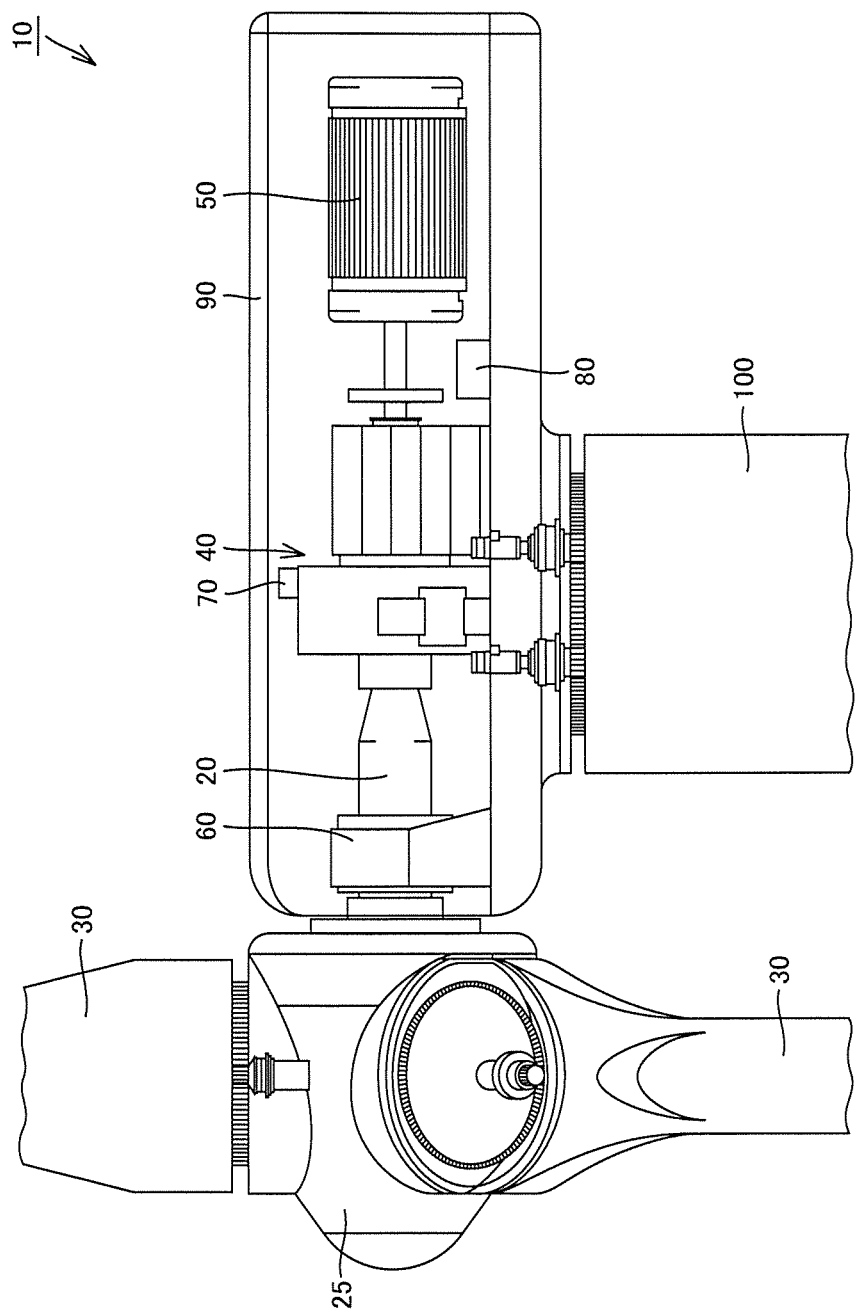
FIG. 1 schematically shows a construction of a wind turbine to which a condition monitoring apparatus according to a first embodiment of the present invention is applied.

An embodiment of the present invention will be described below with reference to the drawings. The same or corresponding elements in the drawings below have the same reference characters allotted and description thereof will not be repeated. Modifications which will be described below may selectively be combined as appropriate.

First Embodiment

A gearbox of a wind turbine will be described below by way of example of an object of which condition is to be monitored by a condition monitoring apparatus. The object is not limited to the gearbox of the wind turbine but should only be an object in which waveform data such as vibration, sound, or acoustic emission (AE) is varied by abnormality. For example, the object includes various types of equipment provided in factories and power plants as well as rail vehicles.

<Construction of Wind Turbine>

FIG. 1 schematically shows a construction of a wind turbine to which a condition monitoring apparatus according to the present embodiment is applied. Referring to FIG. 1, a wind turbine 10 includes a main shaft 20, a hub 25, a blade 30, a gearbox 40, a generator 50, a main shaft bearing 60, a condition monitoring sensor 70, and a data processing device 80. Gearbox 40, generator 50, main shaft bearing 60, condition monitoring sensor 70, and data processing device 80 are stored in a nacelle 90. Nacelle 90 is supported by a tower 100.

Main shaft 20 is introduced into nacelle 90 and connected to an input shaft of gearbox 40, and rotatably supported by main shaft bearing 60. Main shaft 20 transmits rotational torque generated by blade 30 that receives wind power to the input shaft of gearbox 40. Blade 30 is provided on hub 25 and converts wind power into rotational torque and transmits rotational torque to main shaft 20. Main shaft bearing 60 is fixed in nacelle 90 and rotatably supports main shaft 20.

Gearbox 40 is provided between main shaft 20 and generator 50 and increases a rotation speed of main shaft 20 and outputs the speed to generator 50. By way of example, gearbox 40 is implemented by a step-up gear mechanism including a planetary gear, an intermediate shaft, and a high-speed shaft. In gearbox 40, a plurality of bearings that rotatably support a plurality of shafts are provided. The plurality of bearings are implemented, for example, by rolling bearings, and each includes an outer ring (a fixed ring), a rolling element, and an inner ring (a rotating ring).

Condition monitoring sensor 70 is fixed to gearbox 40 and measures waveform data representing a condition of gearbox 40. In the present embodiment, condition monitoring sensor 70 measures a vibration waveform of gearbox 40 and outputs the measured vibration waveform data to data processing device 80. Condition monitoring sensor 70 is implemented, for example, by an acceleration sensor including a piezoelectric element.

Generator 50 is connected to an output shaft of gearbox 40 and generates electric power by rotational torque received from gearbox 40. Generator 50 is implemented, for example, by an induction generator. A bearing that rotatably supports a rotor is provided also in generator 50.

Data processing device 80 is provided in nacelle 90 and receives vibration waveform data of gearbox 40 from condition monitoring sensor 70. Data processing device 80 functions as a condition monitoring apparatus that monitors a condition of gearbox 40 based on vibration waveform data received from condition monitoring sensor 70. Data processing device 80 and condition monitoring sensor 70 make up a condition monitoring system that monitors a condition of gearbox 40.

Data processing device 80 includes a central processing unit (CPU) and a read only memory (ROM) that stores a processing program and a random access memory (RAM) that temporarily stores data, and further includes an input and output port for input and output of various signals (none of which is shown). Data processing device 80 performs various types of data processing in accordance with a program stored in the ROM. Processing performed by data processing device 80 is not limited to software processing and can be performed by dedicated hardware (electronic circuits).

<Overall Functional Configuration of Data Processing Device>

Figure 2:
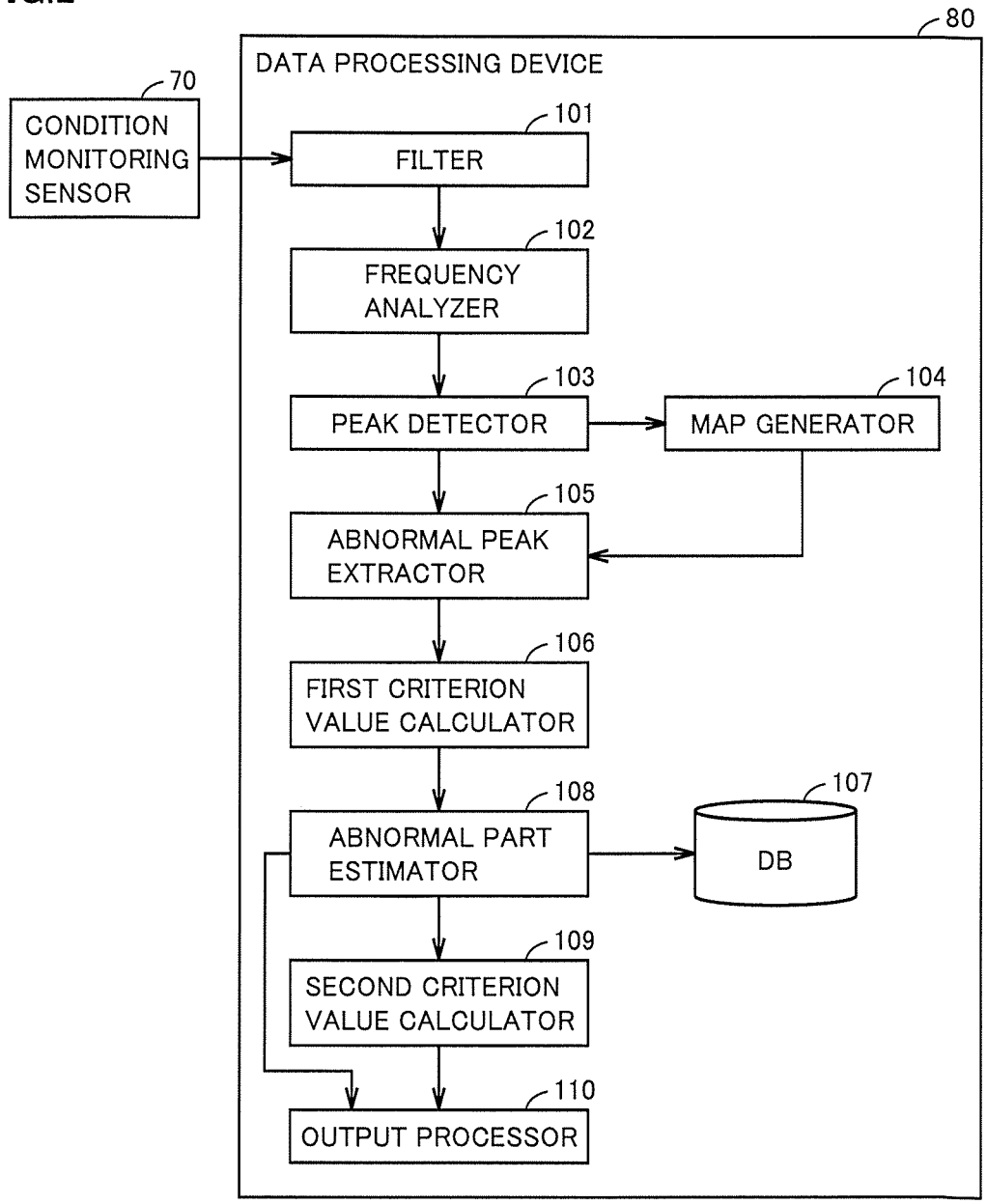
FIG. 2 is a schematic block diagram showing a functional configuration of a data processing device according to the first embodiment.

FIG. 2 is a schematic block diagram showing a functional configuration of data processing device 80 according to the present embodiment. Referring to FIG. 2, data processing device 80 includes a filter 101, a frequency analyzer 102, a peak detector 103, a map generator 104, an abnormal peak extractor 105, a first criterion value calculator 106, a database (DB) 107, an abnormal part estimator 108, a second criterion value calculator 109, and an output processor 110.

<Filter>

Filter 101 performs filtering processing for allowing a component in a predetermined frequency band to pass therethrough and for attenuating a component in other frequency bands onto vibration waveform data received from condition monitoring sensor 70. By way of example, filter 101 includes a high-pass filter that allows a signal component higher than a predetermined frequency to pass therethrough and cuts off a low-frequency component. Filter 101 may perform envelope processing for emphasizing a peak in a frequency spectrum obtained by frequency analyzer 102 which will be described later.

Figure 3:
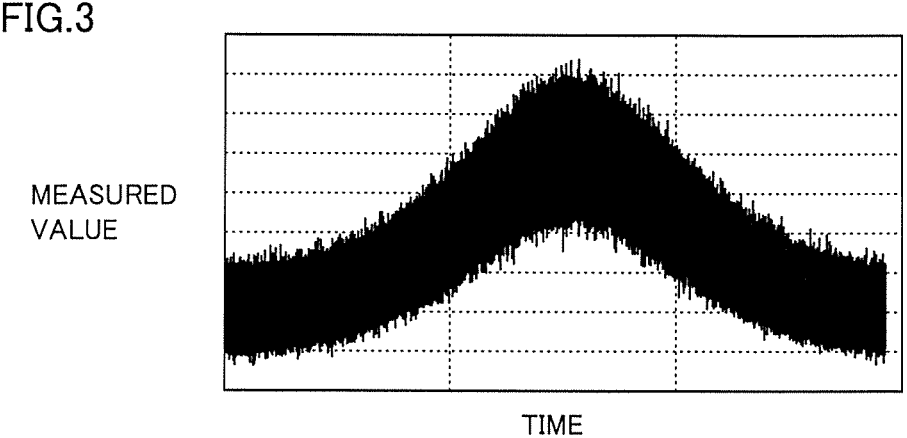
FIG. 3 is a diagram showing an exemplary vibration waveform measured by a condition monitoring sensor.
Figure 4:
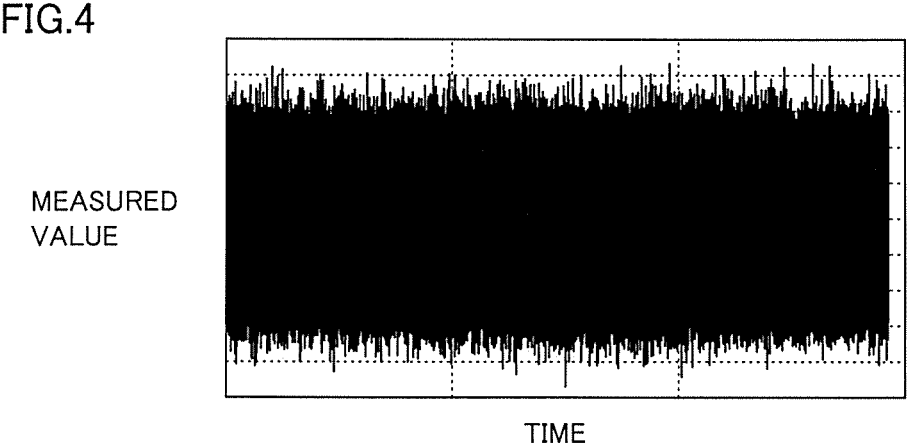
FIG. 4 is a diagram showing a vibration waveform after the vibration waveform shown in FIG. 3 is filtered.

FIG. 3 is a diagram showing an exemplary vibration waveform measured by condition monitoring sensor 70. FIG. 4 is a diagram showing a vibration waveform after filter 101 filtered the vibration waveform shown in FIG. 3. Referring to FIGS. 3 and 4, it can be seen that a low-frequency component has been removed from the vibration waveform data by filter 101.

<Frequency Analyzer>

Frequency analyzer 102 generates a frequency spectrum by subjecting vibration waveform data output from filter 101 to Fourier transform. The frequency spectrum is expressed by a data sequence in which unit data where a frequency and a power spectral density (PSD) at that frequency are brought in correspondence with each other are sequentially arranged in accordance with the frequency.

Figure 5:
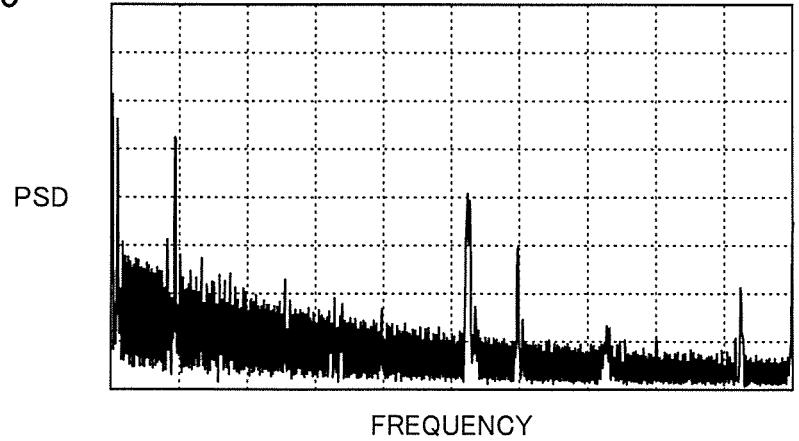
FIG. 5 is a diagram showing an exemplary frequency spectrum generated by a frequency analyzer shown in FIG. 2.

FIG. 5 is a diagram showing an exemplary frequency spectrum generated by frequency analyzer 102. Referring to FIG. 5, the frequency spectrum is expressed by a graph where the abscissa represents a frequency and the ordinate represents a PSD.

<Peak Detector>

Peak detector 103 detects from a frequency spectrum, a peak sufficiently higher than an amount of noise. Peak detector 103 detects as a peak in a frequency spectrum, unit data having a PSD exhibiting a relative maximum value and exceeding a first threshold value.

Figure 6:
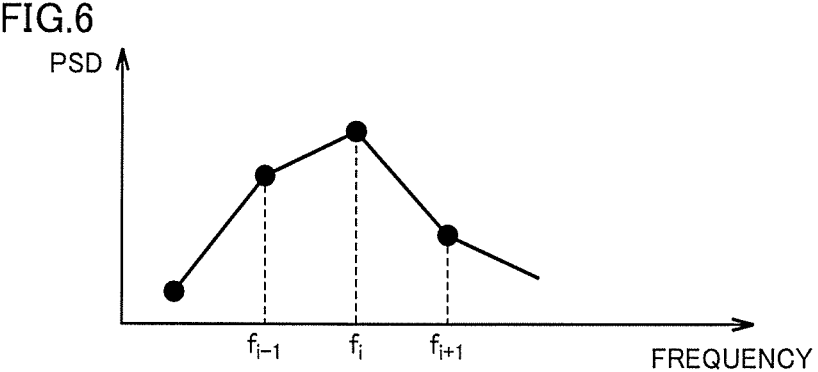
FIG. 6 is a diagram showing unit data having a PSD at a relative maximum value.

FIG. 6 is a diagram showing unit data (unit data at a frequency fi) having a PSD at a relative maximum value. Referring to FIG. 6, among three consecutive pieces of unit data (unit data at frequencies $f_{i-1}$, $f_i$ and $f_{i+1}$), unit data in the middle (unit data at frequency $f_i$) is higher in PSD than adjacent pieces of unit data (unit data at frequency $f_{i-1}$ and unit data at frequency $f_{i+1}$).

Figure 7:
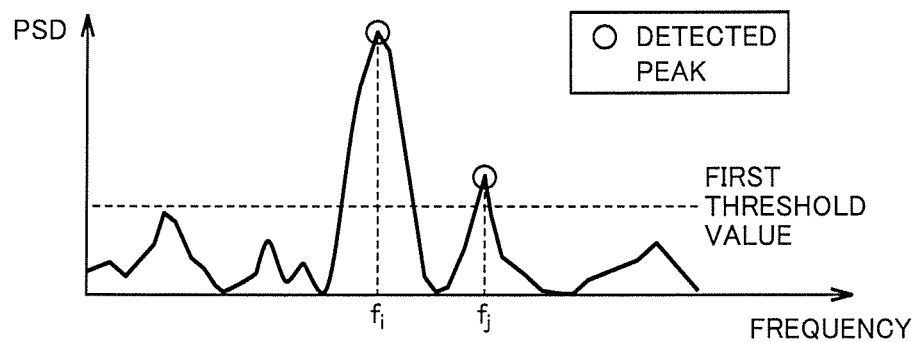
FIG. 7 is a diagram showing unit data having a PSD exhibiting a relative maximum value and being greater than a first threshold value.

FIG. 7 is a diagram showing unit data having a PSD exhibiting a relative maximum value and being greater than a first threshold value. In the example shown in FIG. 7, peak detector 103 detects a peak exhibited by unit data at frequency $f_i$ and a peak exhibited by unit data at a frequency $f_j$.

Peak detector 103 sets a first constant threshold value based on PSDs of all pieces of unit data that define the frequency spectrum. For example, peak detector 103 sets a value ten times as large as a median value of PSDs of all pieces of unit data as the first threshold value.

Peak detector 103 generates a matrix P in an expression (1) below that represents a frequency and a PSD of a peak detected in the frequency spectrum. In the expression (1) below, matrix P shows that peak detector 103 has detected N peaks and an nth (n=1 to N) peak has a frequency $f_n$, and a PSD value $psd_n$.

[Equation 1]

$$P = \begin{bmatrix} f_1 & psd_1 \\ f_2 & psd_2 \\ \vdots & \vdots \\ f_N & psd_N \end{bmatrix}$$ Expression (1)

<Map Generator>

Map generator 104 generates at least one abnormality map for a frequency spectrum obtained by frequency analyzer 102. The abnormality map includes as abnormal components, a frequency of one peak of interest selected from among peaks detected by peak detector 103 and a frequency of a peak that appears in the frequency spectrum together with the peak of interest when the peak of interest is assumed as a peak originating from abnormality of gearbox 40.

Map generator 104 generates for each frequency, as an abnormality map, information where the frequency and a value 0 or 1 are brought in correspondence with each other. In the abnormality map, a value corresponding to a frequency defined as the abnormal component is set to 1 and a value corresponding to a frequency not defined as the abnormal component is set to 0.

When abnormality occurs in any part of gearbox 40, in the frequency spectrum, a peak is produced at a frequency corresponding to that part. How a peak appears in the frequency spectrum is different depending on a part where abnormality occurs and a type of abnormality.

For example, when an outer ring which is a fixed ring of a bearing included in gearbox 40 is damaged, a fundamental wave in accordance with the damage and a harmonic having a frequency having a value of an integer multiple of a frequency of the fundamental wave (fundamental frequency) are generated. An abnormality model where a fundamental wave and a harmonic are generated is referred to as a "first abnormality model" below.

When an inner ring which is a rotating ring of the bearing included in gearbox 40 is damaged, in addition to a fundamental wave in accordance with the damage and a harmonic thereof, a sideband wave of each of the fundamental wave and the harmonic is generated. An abnormality model where a fundamental wave, a harmonic, and a sideband wave of each of the fundamental wave and the harmonic are generated is referred to as a "second abnormality model" below.

Map generator 104 generates two abnormality maps for a peak of interest in accordance with the first abnormality model and the second abnormality model. An abnormality map generated in accordance with the first abnormality model is referred to as a "first abnormality map" below and an abnormality map generated in accordance with the second abnormality model is referred to as a "second abnormality map" below.

As shown in the expression (1) above, when peak detector 103 detects N peaks, map generator 104 selects one peak of interest sequentially from among the N peaks, and generates two abnormality maps for the selected peak of interest. In this case, map generator 104 generates 2N abnormality maps for the frequency spectrum obtained by frequency analyzer 102.

Figure 8:
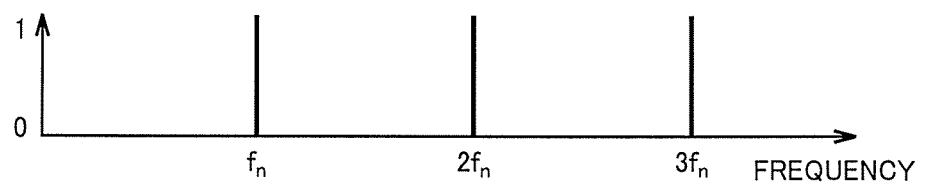
FIG. 8 is a diagram showing an exemplary first abnormality map.

FIG. 8 is a diagram showing an exemplary first abnormality map. Referring to FIG. 8, map generator 104 generates the first abnormality map containing as abnormal components, a frequency $f_n$ of the peak of interest and frequencies $2f_n$, $3f_n$, . . . having values of integer multiples (two times, three times, . . . ) of frequency $f_n$. In other words, map generator 104 generates the first abnormality map that contains as abnormal components, with frequency $f_n$ of the peak of interest being defined as the fundamental frequency, the fundamental frequency and a frequency of a harmonic of a fundamental wave having the fundamental frequency.

Map generator 104 generates a first abnormality map M_n(1) for the peak of interest at frequency $f_n$ as shown in an expression (2) below.

$$M\_n(1)=[\ldots 0010 \ldots 010 \ldots 010 \ldots] \quad \text{Expression (2)}$$

In first abnormality map M_n(1), a value corresponding to a frequency defined as the abnormal component is set to 1 and a value corresponding to a frequency not defined as the abnormal component is set to 0.

Figure 9:
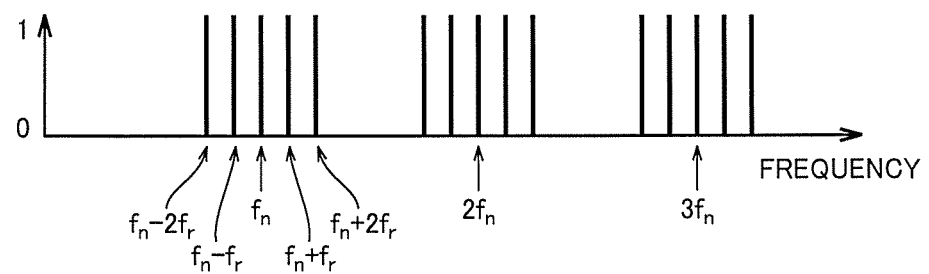
FIG. 9 is a diagram showing an exemplary second abnormality map.

FIG. 9 is a diagram showing an exemplary second abnormality map. Referring to FIG. 9, map generator 104 generates the second abnormality map containing as abnormal components, frequency $f_n$ of the peak of interest, frequencies $2f_n$, $3f_n$, having values of integer multiples (two times, three times, . . . ) of frequency $f_n$, and frequencies $f_n \pm f_r$, $f_n \pm 2f_r$, $2f_n \pm f_r$, $2f_n \pm 2f_r$, $3f_n \pm f_r$, $3f_n \pm 2f_r$ . . . . In other words, map generator 104 generates the second abnormality map that contains as abnormal components, with frequency $f_n$ of the peak of interest being defined as the fundamental frequency, the fundamental frequency, a frequency of a harmonic of a fundamental wave having the fundamental frequency, a frequency of a sideband wave of the fundamental wave, and a frequency of a sideband wave of the harmonic.

A difference $f_r$ between a frequency of a fundamental wave (fundamental frequency) and a frequency of a sideband wave is determined in advance. Alternatively, map generator 104 may set a difference between frequency $f_n$ of a peak of interest and a frequency ($f_{n-1}$ or $f_{n+1}$) of another peak closest to the peak of interest (for example, $|f_{n-1}-f_n|$) as $f_r$.

Map generator 104 generates a second abnormality map M_n(2) for a peak of interest at frequency $f_n$ as shown in an expression (3) below.

$$M\_n(2)=[\ldots 0010010010010010 \ldots 01001 \ldots] \quad \text{Expression (3)}$$

In second abnormality map M_n(2), a value corresponding to a frequency defined as the abnormal component is set to 1 and a value corresponding to a frequency not defined as the abnormal component is set to 0.

<Abnormal Peak Extractor>

Abnormal peak extractor 105 sequentially selects as a map of interest, one abnormality map from among abnormality maps generated by map generator 104, and extracts, for each map of interest, an abnormal peak from peaks detected by peak detector 103. The abnormal peak refers to a peak of which frequency difference from any of abnormal components included in the map of interest is equal to or smaller than a prescribed value. Abnormal peak extractor 105 may extract only a peak of which frequency difference from any of abnormal components included in the map of interest is 0 (that is, a peak that matches with any of abnormal components) as the abnormal peak or may extract a peak of which frequency difference is not greater than a prescribed value th (th>0) as the abnormal peak. By extracting an abnormal peak by using prescribed value th, influence by an error in measurement by condition monitoring sensor 70 or an error caused in Fourier transform by frequency analyzer 102 can be eliminated and accuracy in extraction of the abnormal peak can be improved.

Abnormal peak extractor 105 can extract an abnormal peak by subjecting matrix P shown in the expression (1) and a kth abnormality map M_n(k) (k=1 or 2) shown in the expression (2) or (3) to AND processing and masking a peak at a frequency not defined as the abnormal component.

Abnormal peak extractor 105 generates a matrix Pex_n(k) representing a frequency and a value of a PSD of the abnormal peak extracted by using kth abnormality map M_n(k) generated for an nth detected peak (a peak at frequency $f_n$) (see an expression (4) below). In matrix Pex_n(k), fex_$n_m$(k) represents a frequency of an mth abnormal peak and psdex_$n_m$(k) represents a value of the PSD of the mth abnormal peak.

[Equation 2]

$$Pex\_n(k) = \begin{bmatrix} fex\_n_{1(k)} & psdex\_n_{1(k)} \\ fex\_n_{2(k)} & psdex\_n_{2(k)} \\ \vdots & \vdots \end{bmatrix} \quad \text{Expression (4)}$$

Figure 10:
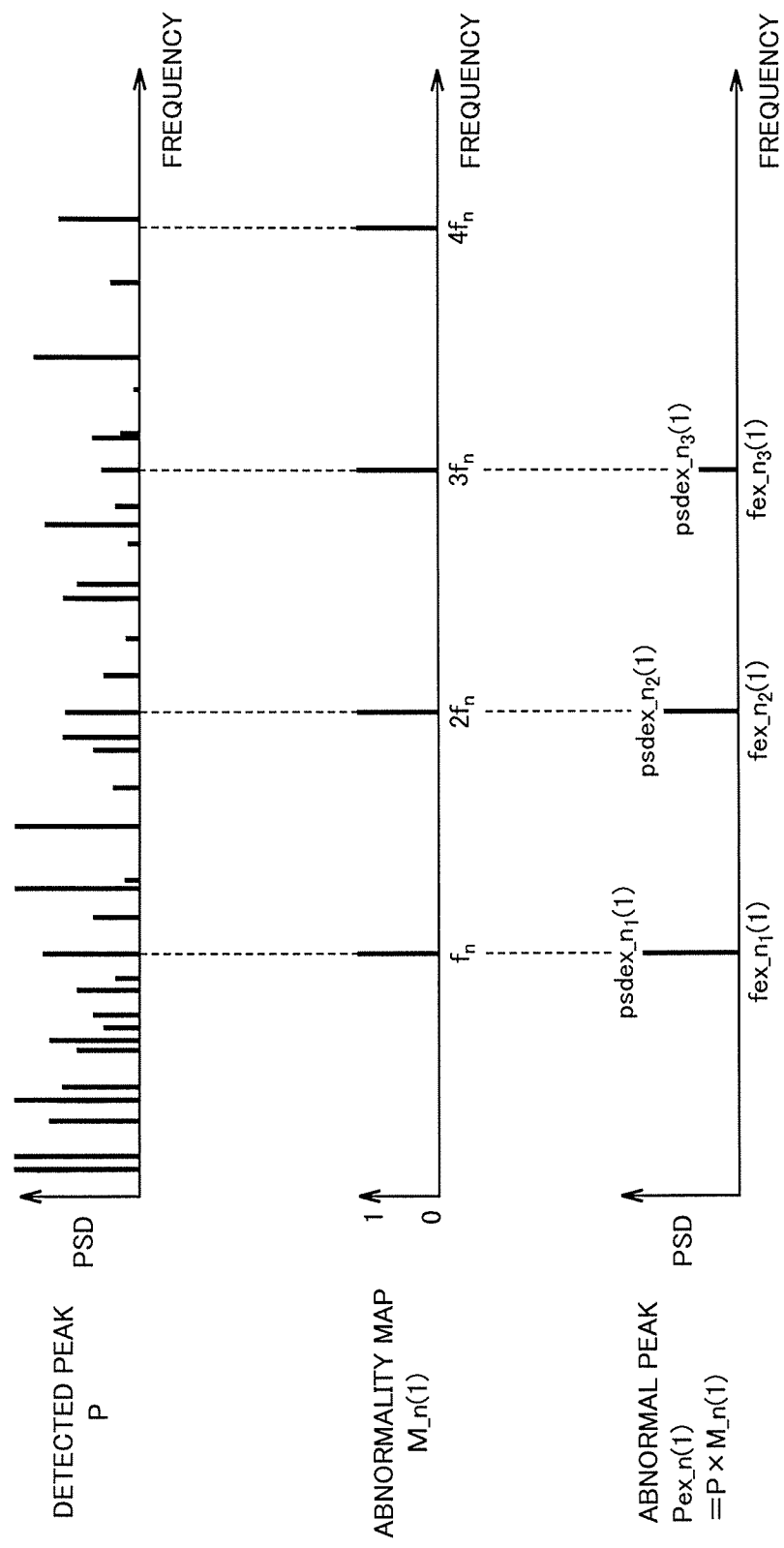
FIG. 10 is a diagram showing relation among a detected peak, the first abnormality map, and an abnormal peak.

FIG. 10 is a diagram showing relation among a detected peak, the first abnormality map, and an abnormal peak. Referring to FIG. 10, by using first abnormality map M_n(1) generated for the peak at frequency $f_n$, abnormal peak extractor 105 extracts three abnormal peaks at frequencies fex_$n_1$(1), fex_$n_2$(1), and fex_$n_3$(1). Frequency fex_$n_1$(1)

matches with frequency $f_n$. Values of the PSD of the three abnormal peaks are psdex_$n_1$(1), psdex_$n_2$(1), and psdex_$n_3$(1), respectively.

Figure 11:
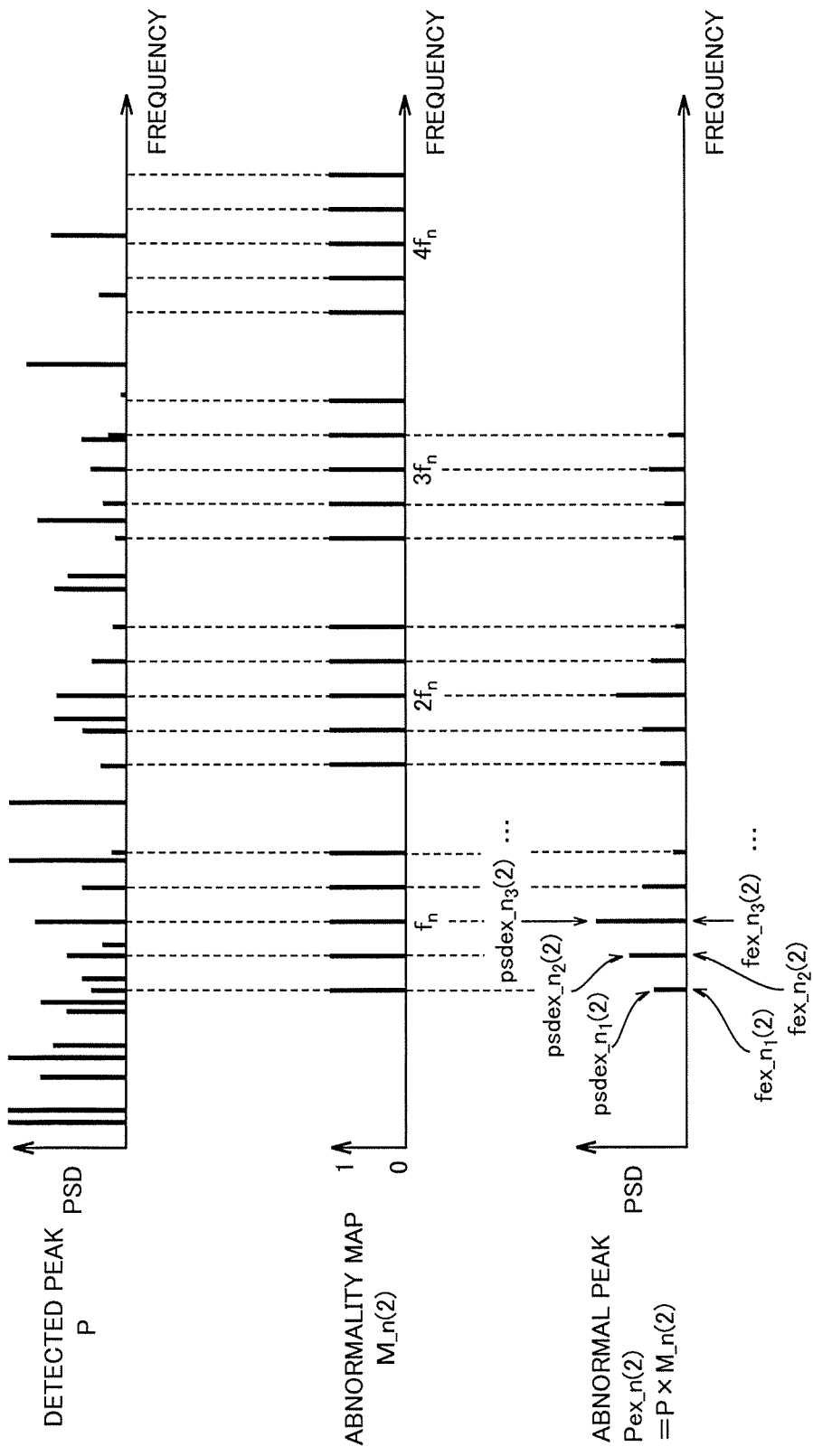
FIG. 11 is a diagram showing relation among a detected peak, the second abnormality map, and an abnormal peak.

FIG. 11 is a diagram showing relation among a detected peak, the second abnormality map, and an abnormal peak. Referring to FIG. 11, by using second abnormality map M_n(2) generated for the peak at frequency $f_n$, abnormal peak extractor 105 extracts a plurality of abnormal peaks at frequencies fex_$n_1$(2), fex_$n_2$(2), . . . Frequency fex_$n_3$(2) matches with frequency $f_n$. Values of the PSD of the plurality of abnormal peaks are psdex_$n_1$(2), psdex_$n_2$(2), respectively.

<First Criterion Value Calculator>

First criterion value calculator 106 calculates for each map of interest, a first criterion value representing occurrence of abnormality corresponding to the map of interest, based on the PSD of the abnormal peak. First criterion value calculator 106 calculates as the first criterion value, the sum of PSDs of abnormal peaks extracted by abnormal peak extractor 105. Specifically, first criterion value calculator 106 calculates a first criterion value En(k) in accordance with an expression (5) below, with the kth abnormality map generated for the peak at frequency $f_n$ being defined as the map of interest.

[Equation 3]

$$En(k) = \sum_m psdex\_n_{m(k)} \quad \text{Expression (5)}$$

FIG. 12 is a diagram showing an exemplary first criterion value calculated by first criterion value calculator 106. Referring to FIG. 12, first criterion value calculator 106 calculates for each detected peak, a first criterion value corresponding to two abnormality maps generated for that peak. Therefore, when peak detector 103 detects N peaks, first criterion value calculator 106 calculates 2N first criterion values.

<Database>

Database 107 stores, for each part of gearbox 40, abnormal part information where part information for identifying the part, model information for identifying an abnormality model corresponding to abnormality of the part, a frequency of a fundamental wave (fundamental frequency) generated due to abnormality of the part, and a second threshold value are brought in correspondence with one another.

FIG. 13 is a diagram showing exemplary abnormal part information stored in database 107. Referring to FIG. 13, database 107 stores, for example, abnormal part information in connection with an outer ring of the bearing included in gearbox 40 indicating that an abnormality model corresponding to abnormality of the outer ring is the first abnormality model, the frequency of the fundamental wave generated due to abnormality of the outer ring is 37.2 Hz, and the second threshold value is set to 100.

The abnormal part information stored in database 107 is prepared in advance through experiments or simulation with gearbox 40 being adopted as an object. In the experiments or simulation, the second threshold value is set to a value smaller than a total value of PSDs of fundamental waves and harmonics (in an example of the second abnormality model, fundamental waves, harmonics, and sideband waves) generated at the time of occurrence of abnormality in a corresponding part and sufficiently greater than noise.

<Abnormal Part Estimator>

Abnormal part estimator 108 estimates a part of gearbox 40 where abnormality has occurred based on the first criterion value calculated for each map of interest and abnormal part information stored in database 107.

Specifically, abnormal part estimator 108 extracts from database 107 for each map of interest, abnormal part information satisfying conditions (a) to (c) below as identification information. The condition (a) is defined as a condition that the abnormality model identified by the model information in the abnormal part information matches with the abnormality model corresponding to the map of interest. The condition (b) is defined as a condition that a difference between the fundamental frequency in the abnormal part information and the frequency of the peak of interest corresponding to the map of interest (frequency difference) is equal to or smaller than a prescribed value. The condition (c) is defined as a condition that the second threshold value in the abnormal part information is smaller than the first criterion value corresponding to the map of interest.

When abnormal part estimator 108 could successfully extract identification information corresponding to the map of interest, it estimates that abnormality has occurred in a part identified by the part information in the extracted identification information. Abnormal part estimator 108 further generates estimation result information including the part information, the model information, and the fundamental frequency in the extracted identification information as well as the first criterion value corresponding to the map of interest, and outputs the generated estimation result information to second criterion value calculator 109 and output processor 110.

When abnormal part estimator 108 is unable to extract the identification information corresponding to the map of interest, it compares the first criterion value corresponding to the map of interest with a third threshold value. The third threshold value is set in advance to a value sufficiently larger than noise. When the first criterion value exceeds the third threshold value, abnormal part estimator 108 estimates that abnormality has occurred in a part that has not yet been registered in database 107. Abnormal part estimator 108 further generates estimation result information including part information indicating that the part where abnormality has occurred is unknown, model information representing an abnormality model corresponding to the map of interest, frequency $f_n$ of the peak of interest corresponding to the map of interest, and the first criterion value corresponding to the map of interest, and outputs the generated estimation result information to second criterion value calculator 109 and output processor 110. The estimation result information shows that abnormality has occurred in a part that has not yet been registered in database 107.

FIG. 14 is a diagram showing exemplary estimation result information generated by abnormal part estimator 108. FIG. 14 shows exemplary estimation result information when the first criterion value shown in FIG. 12 is calculated, database 107 stores abnormal part information shown in FIG. 13, and the third threshold value is set to 300. Abnormal part estimator 108 confirms that the first criterion value corresponding to the abnormality map generated by using the first abnormality model for a peak at a frequency of 37.2 Hz is greater than the second threshold value in the abnormal part information representing the abnormality model with that frequency being defined as the fundamental frequency. Abnormal part estimator 108 thus estimates the "outer ring of bearing" as a part where abnormality has occurred and generates estimation result information representing the result of estimation (see the second row in FIG. 14).

Abnormal part estimator 108 further confirms that the first criterion value corresponding to the abnormality map generated by using the first abnormality model for a peak at a frequency of 87.9 Hz and the first criterion value corresponding to the abnormality map generated by using the second abnormality model for a peak at a frequency of 191.6 Hz are greater than the third threshold value "300". Abnormal part estimator 108 thus estimates that abnormality has occurred in two unknown parts and generates estimation result information corresponding to each of the two parts (see third and fourth rows in FIG. 14).

<Second Criterion Value Calculator>

Second criterion value calculator 109 calculates as a second criterion value, for each frequency spectrum, the sum of first criterion values included in the estimation result information generated for the frequency spectrum. Second criterion value calculator 109 outputs the calculated second criterion value to output processor 110.

<Output Processor>

Output processor 110 outputs to a terminal device of a user located at a remote location, the estimation result information and the second criterion value by using a wired or wireless communication system. The terminal device can thus have, for example, a display show the estimation result information and the second criterion value. Consequently, the user can readily check the estimation result information and the second criterion value.

<Flow of Processing in Data Processing Device>

Figure 15:
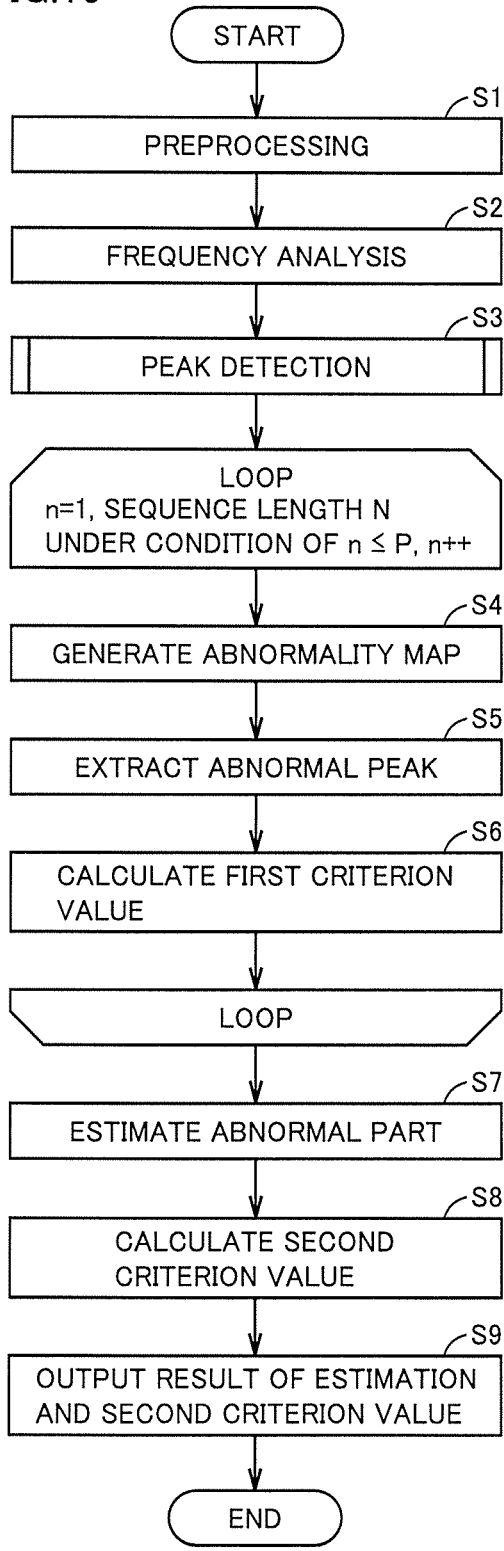
FIG. 15 is a flowchart showing a flow of processing in a data processing device according to an embodiment.

A flow of processing in data processing device 80 will now be described with reference to FIG. 15. FIG. 15 is a flowchart showing a flow of processing in data processing device 80.

Initially, in step S1, data processing device 80 performs preprocessing such as filtering of vibration waveform data received from condition monitoring sensor 70. The preprocessing is performed by filter 101.

Then, in step S2, data processing device 80 generates a frequency spectrum by subjecting the preprocessed vibration waveform data to Fourier transform as frequency analysis processing. The frequency analysis processing is performed by frequency analyzer 102.

Then, in step S3, data processing device 80 detects a peak sufficiently higher than noise in the frequency spectrum. The peak detection processing is performed by peak detector 103. Data processing device 80 is assumed to have detected N peaks. Data processing device 80 sequentially selects one peak of interest from among the detected N peaks and performs processing in steps S4 to S6 onto the selected peak of interest. Processing in steps S4 to S6 is performed for each of N peaks detected in step S3.

In step S4, data processing device 80 generates the first abnormality map and the second abnormality map for the peak of interest. Processing for generating the abnormality map is performed by map generator 104.

Then, in step S5, data processing device 80 extracts as the first abnormal peak, from the N peaks detected in step S3, a peak of which frequency difference from any abnormal component in the first abnormality map generated in step S4 is equal to or smaller than a prescribed value. Similarly, data processing device 80 extracts as the second abnormal peak, from the N peaks detected in step S3, a peak of which frequency difference from any abnormal component in the second abnormality map generated in step S4 is equal to or smaller than a prescribed value. Processing for extracting the abnormal peak is performed by abnormal peak extractor 105.

Then, in step S6, data processing device 80 calculates the sum of PSDs of the first abnormal peaks extracted by using the first abnormality map, as the first criterion value corresponding to the first abnormality map. Similarly, data processing device 80 calculates the sum of PSDs of the second abnormal peaks extracted by using the second abnormality map, as the first criterion value corresponding to the second abnormality map. Processing for calculating the first criterion value is performed by first criterion value calculator 106.

As processing in steps S4 to S6 is performed for each of N peaks, 2N abnormality maps are generated and 2N first criterion values corresponding to the 2N respective abnormality maps are calculated.

When processing in steps S4 to S6 onto each of N peaks ends, data processing device 80 sequentially selects one abnormality map from among 2N abnormality maps as the map of interest and performs processing in step S7 onto the selected map of interest. In step S7, data processing device 80 compares the first criterion value corresponding to the map of interest, the fundamental frequency of the map of interest, and the abnormality model corresponding to the map of interest with the abnormal part information stored in database 107, and generates estimation result information based on a result of comparison. As described above, the estimation result information includes part information in any abnormal part information stored in database 107 or part information representing "unknown". Processing for estimating an abnormal part is performed by abnormal part estimator 108.

When processing in step S7 for all of 2N abnormality maps ends, in step S8, data processing device 80 then calculates the sum of the first criterion values included in the estimation result information as the second criterion value. Processing for calculating the second criterion value is performed by second criterion value calculator 109.

Finally, data processing device 80 outputs the estimation result information and the second criterion value to a terminal device of a user (step S9) and quits the process. The output processing is performed by output processor 110.

<Flow in Peak Detection Processing>

Figure 16:
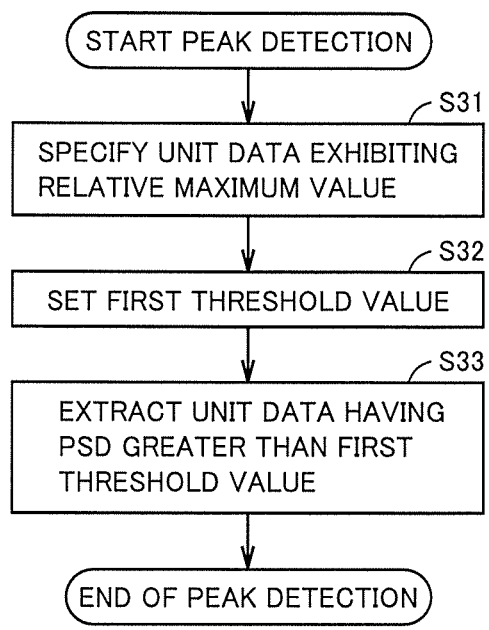
FIG. 16 is a flowchart showing a flow of a sub routine of peak detection processing shown in FIG. 15.

A flow of a sub routine of peak detection processing (step S3) shown in FIG. 15 will now be described with reference to FIG. 16. FIG. 16 is a flowchart showing a flow of the sub routine of peak detection processing.

Initially, in step S31, data processing device 80 specifies unit data that exhibits a vertex of a projection in a frequency spectrum. Specifically, data processing device 80 specifies unit data having a PSD at a relative maximum value among pieces of unit data that make up a data sequence expressing a frequency spectrum (see FIG. 6).

Then, in step S32, data processing device 80 sets the first threshold value based on values of the PSD of all pieces of unit data specified in step S31. For example, data processing device 80 sets as the first threshold value, a value ten times as large as the median value of the PSDs of all pieces of unit data specified in step S31.

Then, in step S33, data processing device 80 extracts unit data having the PSD exceeding the first threshold value from the pieces of unit data specified in step S31 and detects the extracted unit data as the peak. The sub routine of step S3 thus ends.

Advantages

Data processing device (condition monitoring apparatus) 80 according to the embodiment includes peak detector 103, map generator 104, abnormal peak extractor 105, and first criterion value calculator 106. Peak detector 103 detects at least one peak in a frequency spectrum obtained by frequency analysis of vibration waveform data. Map generator 104 generates at least one abnormality map for the vibration waveform data. Abnormal peak extractor 105 selects as a map of interest, one abnormality map from among at least one abnormality map, and extracts as the abnormal peak from detected peaks, a peak of which frequency difference from any of abnormal components included in the map of interest is equal to or smaller than a prescribed value. First criterion value calculator 106 calculates a first criterion value representing occurrence of abnormality corresponding to the map of interest based on a spectral density of the abnormal peak.

According to the configuration, for each abnormality map generated based on the peak detected in the frequency spectrum, the first criterion value representing occurrence of abnormality corresponding to the map of interest is calculated. Not only a frequency component corresponding to a theoretical value of an abnormal frequency calculated in advance as in a conventional example but also all peaks that appear in the frequency spectrum are taken into consideration, so that the first criterion value is calculated for each abnormality map generated for each peak. Thus, even though a peak is produced at a frequency deviated from the theoretical value under some kind of influence, presence or absence of abnormality which has resulted in the peak can accurately be determined by checking the first criterion value corresponding to the abnormality map generated for that peak. Furthermore, by checking the first criterion value, presence or absence of abnormality of which origin is unknown can also be determined.

The abnormality map includes as abnormal components, not only a frequency of a peak of interest but also a frequency of a peak that appears together with the peak of interest when the peak of interest is assumed as a peak originating from abnormality in gearbox 40. Therefore, the first criterion value is calculated in consideration not only of the peak of interest but also a peak accompanying the peak of interest. Thus, even though the peak of interest contains noise, whether or not abnormality corresponding to the peak of interest has occurred can accurately be determined by checking the first criterion value calculated in consideration also of a peak accompanying the peak of interest.

Data processing device 80 configured as above can thus output the first criterion value for accurately determining whether or not abnormality has occurred in gearbox 40 adopted as an object.

The frequency spectrum is expressed by a data sequence in which unit data where a frequency and a spectral density at the frequency are brought in correspondence with each other are sequentially arranged in accordance with the frequency. Peak detector 103 detects as a peak from the data sequence, unit data having a spectral density exhibiting the relative maximum value and exceeding the first threshold value. For example, a value greater than noise is set as the first threshold value. Erroneous detection of noise as a peak can thus be suppressed.

Peak detector 103 sets a constant first threshold value based on a frequency spectrum. Load imposed by processing for detection of a peak by peak detector 103 can thus be lessened.

Map generator 104 generates a first abnormality map where, with a frequency of the peak of interest being defined as the fundamental frequency, the fundamental frequency and a frequency of a harmonic of a fundamental wave having the fundamental frequency are defined as abnormal components and a second abnormality map where the fundamental frequency, a frequency of a sideband wave of the fundamental wave, a frequency of a harmonic, and a frequency of a sideband wave of the harmonic are defined as abnormal components. In general, when abnormality occurs in a fixed ring of a rolling bearing, a fundamental wave of a frequency in accordance with the abnormality and a harmonic thereof are generated. When abnormality occurs in a rotating ring, a fundamental wave of a frequency in accordance with the abnormality, a harmonic thereof, and sideband waves of the fundamental wave and the harmonic are generated. Many other abnormalities also often lead to generation of a fundamental wave and a harmonic thereof or generation of a fundamental wave, a harmonic thereof, and sideband waves thereof. Therefore, according to the configuration above, whether or not abnormality has occurred in various parts can be determined by checking the first criterion value corresponding to the generated abnormality map.

The abnormality map includes information where a frequency and a value 0 or 1 are brought in correspondence with each other for each frequency, a value corresponding to a frequency defined as the abnormal component is set to 1, and a value corresponding to a frequency not defined as the abnormal component is set to 0. Abnormal peak extractor 105 extracts the abnormal peak by subjecting the unit data detected as the peak by peak detector 103 and the map of interest to AND processing and masking the peak at the frequency not defined as the abnormal component. Abnormal peak extractor 105 can thus readily extract the abnormal peak.

First criterion value calculator 106 calculates the sum of spectral densities of the abnormal peaks as the first criterion value. In general, as a degree of abnormality is higher, a spectral density of a peak produced by the abnormality is higher. Therefore, a degree of abnormality can readily be determined by checking the first criterion value expressed as the sum of spectral densities.

Data processing device 80 includes database 70 and abnormal part estimator 108. Database 107 stores, for each part of gearbox 40, abnormal part information where the second threshold value, part information for identifying a part, a fundamental frequency of a fundamental wave originating from abnormality of the part, and model information for identifying an abnormality model are brought in correspondence with one another. Abnormal part estimator 108 extracts as the identification information from database 107, the abnormal part information representing the second threshold value smaller than the first criterion value corresponding to the map of interest, representing the fundamental frequency of which difference from the peak of interest corresponding to the map of interest is equal to or smaller than a prescribed value, and representing the model information for identifying the abnormality model corresponding to the map of interest. Abnormal part estimator 108 generates estimation result information (first estimation result information) indicating that abnormality has occurred in a part identified by the part information in the extracted identification information. Data processing device 80 can thus accurately estimate a part where abnormality has occurred, based on the abnormal part information registered in advance in database 107.

Abnormal part estimator 108 generates, when the abnormal part estimator is unable to extract the identification information for the map of interest and the first criterion value corresponding to the map of interest exceeds the third threshold value, estimation result information (second estimation result information) indicating that abnormality that has not yet been registered in database 107 has occurred. Data processing device 80 can thus detect also abnormality of which origin is unknown.

Data processing device 80 includes second criterion value calculator 109. Second criterion value calculator 109 calculates as the second criterion value, the sum of the first criterion value in the map of interest for which identification information has been extracted by abnormal part estimator 108 and the first criterion value in the map of interest for which identification information has not been extracted and in which the corresponding first criterion value exceeds the third threshold value. A degree of abnormality of all parts in gearbox 40 can comprehensively be determined by checking the second criterion value.

The condition monitoring method in the present embodiment includes steps S3, S4, S5, and S6 as shown in FIG. 15. In step S3, at least one peak is detected from a frequency spectrum obtained by frequency analysis of vibration waveform data. In step S4, at least one abnormality map for the vibration waveform data is generated. In step S5, one abnormality map is selected as the map of interest, and a peak of which frequency difference from any of abnormal components included in the map of interest is equal to or smaller than a prescribed value is extracted as the abnormal peak from peaks detected in step S3. In step S6, the first criterion value representing occurrence of abnormality corresponding to the map of interest is calculated based on a spectral density of the abnormal peak. According to the method above as well, the first criterion value for accurately determining whether or not abnormality has occurred in gearbox 40 adopted as an object can be output.

<First Modification>

In the description above, map generator 104 is defined as generating two abnormality maps for one peak of interest. The number of abnormality maps generated for one peak of interest may be set to one, or three or more.

Depending on an object of which condition is to be monitored, abnormality in accordance with a single type of abnormality model (for example, the first abnormality model or the second abnormality model) may be dominant. In this case, map generator 104 should only generate one abnormality map (for example, the first abnormality map or the second abnormality map) for one peak of interest. Database 107 should only store abnormal part information including model information for identifying the abnormality model used in generation of the abnormality map. Therefore, abnormal part estimator 108 should extract as identification information from database 107, the abnormal part information representing the second threshold value smaller than the first criterion value corresponding to the map of interest and representing the fundamental frequency of which difference from the peak of interest corresponding to the map of interest is equal to or smaller than a prescribed value.

Alternatively, depending on an object of which condition is to be monitored, abnormality in accordance with another abnormality model in addition to the first abnormality model and the second abnormality model may occur. For example, when great wear occurs in a bearing, a PSD may increase in a prescribed frequency band. A frequency band where the PSD increases is different depending on various factors of a bearing or a location of occurrence of wear. Such an abnormality model that a PSD increases in a prescribed frequency band is called a "third abnormality model" below.

When abnormality in accordance with the third abnormality model may occur in an object, map generator 104 has a prescribed frequency band corresponding to the third abnormality model stored in advance. When any of peaks detected by peak detector 103 is included in the prescribed frequency band of the third abnormality model, map generator 104 generates a third abnormality map where a frequency within the prescribed frequency band is defined as the abnormal component.

Map generator 104 generates a third abnormality map M(3) as shown in an expression (6) below.

$$M(3)=[\ldots 00011 \ldots 1100 \ldots]$$ Expression (6)

In third abnormality map M(3), a value corresponding to a frequency defined as the abnormal component is set to 1 and a value corresponding to a frequency not defined as the abnormal component is set to 0. Map generator 104 may generate a plurality of third abnormality maps different in frequency band where a PSD increases. For example, map generator 104 may generate x types of third abnormality maps M_1(3) to M_x(3). Each of M_1(3) to M_x(3) is expressed by an expression similar to the expression (6) above.

FIG. 17 is a diagram showing relation among a detected peak, the third abnormality map, and an abnormal peak. Referring to FIG. 17, abnormal peak extractor 105 extracts as the abnormal peak from peaks detected by peak detector 103, a peak included in a prescribed frequency band (a band from a frequency fa to a frequency fb) shown in third abnormality map M(3).

When map generator 104 generates the first to third abnormality maps as well, data processing device 80 performs processing in accordance with the flowchart shown in FIG. 15. The frequency of the abnormal component in the third abnormality map is determined in advance and does not depend on a frequency of a peak detected by peak detector 103. Therefore, when a plurality of peaks at frequencies within the prescribed frequency band in the third abnormality model are detected in step S3, data processing device 80 should generate the third abnormality map only in step S4 where any one of the plurality of peaks is defined as the peak of interest. Only in step S6 following step S4, the first criterion value for the third abnormality map is calculated.

When abnormality in accordance with the third abnormality model may occur in an object, database 107 stores abnormal part information including model information representing the third abnormality model.

FIG. 18 is a diagram showing an example of a result of calculation of the first criterion value, abnormal part information stored in database 107, and estimation result information when abnormality in accordance with first to third abnormality models may occur in an object. FIG. 18 (a) shows an exemplary result of calculation of the first criterion value, FIG. 18 (b) shows exemplary abnormal part information, and FIG. 18 (c) shows exemplary estimation result information.

In the example shown in FIG. 18 (a), map generator 104 generates the third abnormality map where 100 to 200 Hz is defined as the abnormal component and the third abnormality map where 200 to 500 Hz is defined as the abnormal component. First criterion value calculator 106 calculates the first criterion value "600" for the third abnormality map where 100 to 200 Hz is defined as the abnormal component and calculates the first criterion value "150" for the third abnormality map where 200 to 500 Hz is defined as the abnormal component.

Database 107 stores abnormal part information corresponding to the third abnormality model where 100 to 200 Hz is defined as the prescribed frequency band and abnormal part information corresponding to the third abnormality model where 200 to 500 Hz is defined as the prescribed frequency band.

In the example shown in FIG. 18, the first criterion value "600" calculated for the third abnormality map where 100 to 200 Hz is defined as the abnormal component exceeds the second threshold value "300" in the abnormal part information corresponding to the third abnormality model where 100 to 200 Hz is defined as the prescribed frequency band. Therefore, abnormal part estimator 108 estimates a bearing identified by the part information in the abnormal part information corresponding to the third abnormality model where 100 to 200 Hz is defined as the prescribed frequency band as a part where abnormality in wear has occurred, as shown in FIG. 18 (c).

<Second Modification>

In the description above, peak detector 103 sets a constant first threshold value. Peak detector 103, however, may set, based on a frequency spectrum, a first threshold value varied in accordance with a frequency. For example, peak detector 103 sets the first threshold value to be compared with the PSD of unit data at a certain frequency to a value ten times as large as the median value of the PSDs of unit data at frequencies within a frequency band including that frequency (for example, a band within a range of that frequency±50 Hz).

Figure 19:
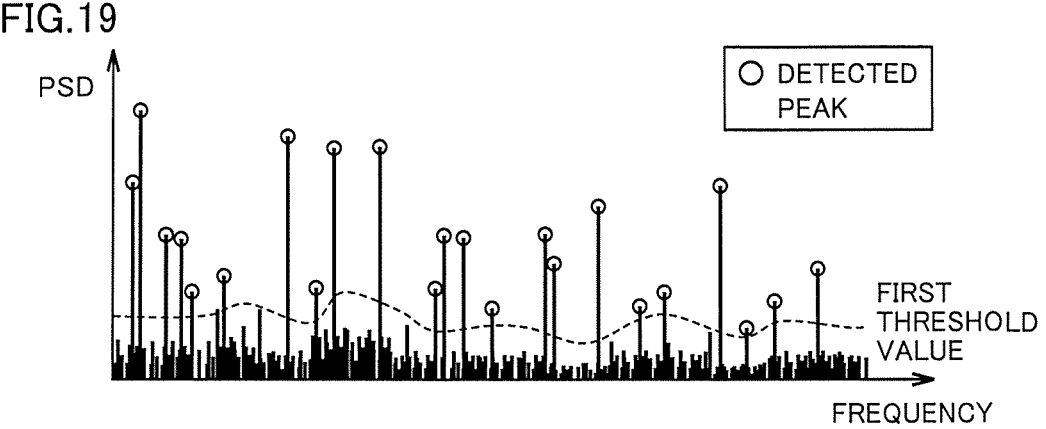
FIG. 19 is a diagram showing an exemplary peak detected by using the first threshold value varied in accordance with a frequency.

FIG. 19 is a diagram showing an exemplary peak detected by using the first threshold value varied in accordance with a frequency. As shown in FIG. 19, even though a noise level is varied in accordance with a frequency, the first threshold value is varied in accordance with the noise level and hence erroneous detection of noise as a peak can be prevented.

<Third Modification>

In general, as a degree of abnormality is higher, the number of harmonics of an abnormal peak that appears in a frequency spectrum is larger. As the order is higher, the PSD of the harmonic is lower. Therefore, the PSD of the harmonic may be weighted in accordance with the order so as to avoid underestimation of a higher-order harmonic.

For example, map generator 104 sets a weight coefficient for each abnormal component in generation of the first abnormality map and the second abnormality map. Specifically, for abnormal components at frequencies of a harmonic and a sideband wave thereof, map generator 104 sets a greater weight coefficient as the order is higher. For example, map generator 104 sets a weight coefficient Wp=p for an abnormal component at a frequency of a harmonic of a pth order (a pth harmonic) and a sideband wave thereof. Map generator 104 sets a weight coefficient W1=1 for an abnormal component at a frequency of a fundamental wave and a sideband wave thereof.

Figure 20:
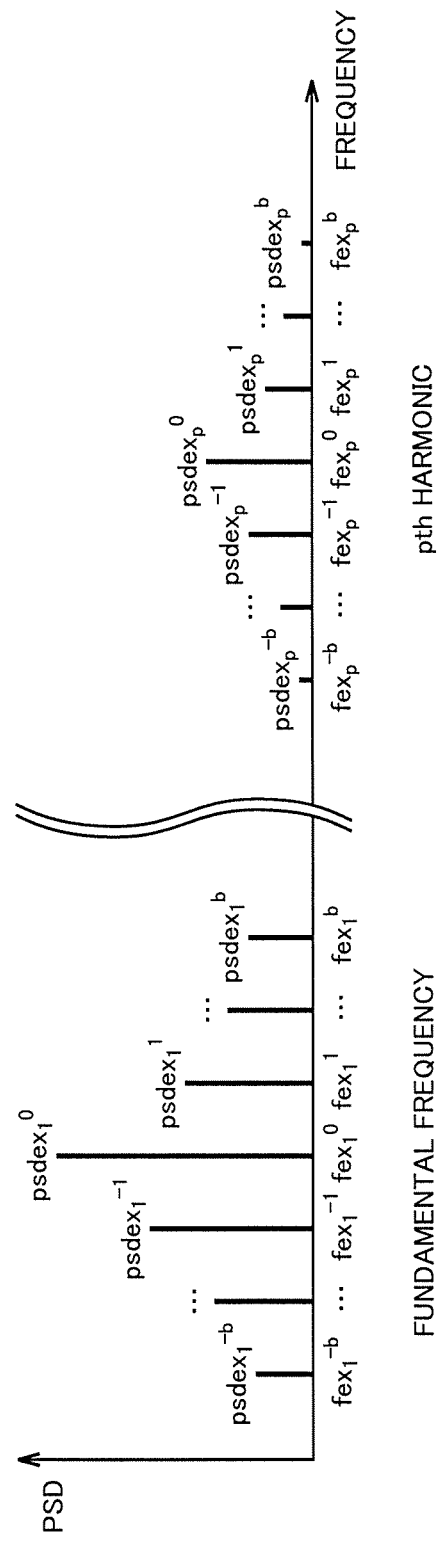
FIG. 20 is a diagram showing an exemplary abnormal peak extracted by using the second abnormality map.

FIG. 20 is a diagram showing an exemplary abnormal peak extracted by using the second abnormality map. An abnormal peak of which frequency is $fex_1^0$ and PSD is $psdex_1^0$ in FIG. 20 is a peak corresponding to an abnormal component representing a fundamental wave in the second abnormality map. An abnormal peak of which frequency is $fex_p^0$ and PSD is $psdex_p^0$ is a peak corresponding to an abnormal component representing a pth harmonic in the second abnormality map. An abnormal peak of which frequency is $fex_1^b$ and PSD is $psdex_1^b$ (b= ..., −2, −1, 1, 2, ...) is a peak corresponding to an abnormal component representing a sideband wave of the fundamental wave in the second abnormality map. An abnormal peak of which frequency is $fex_p^b$ and PSD is $psdex_p^b$ (b= ..., −2, −1, 1, 2, ...) is a peak corresponding to an abnormal component representing a sideband wave of the pth harmonic in the second abnormality map.

As shown in FIG. 20, the PSD of the pth harmonic and the sideband wave thereof is smaller than the PSD of the fundamental wave and the sideband wave thereof. Therefore, first criterion value calculator 106 should calculate a first criterion value E for the second abnormality map in accordance with expressions (7) and (8) below.

[Equation 4]

$$E = \sum_p E_p \times W_p \quad \text{Expression (7)}$$

$$E_p = \sum_b psdex_p^b \quad \text{Expression (8)}$$

For the first abnormality map without a sideband wave, first criterion value calculator 106 should calculate the first criterion value in accordance with the expressions (7) and (8) with b=0 being set in the expression (8).

<Fourth Modification>

In the description above, condition monitoring sensor 70 measures vibration waveform data. Condition monitoring sensor 70, however, is an acoustic emission (AE) sensor and may measure waveform data in an ultrasonic range. Alternatively, condition monitoring sensor 70 may measure sound waveform data in a range other than the ultrasonic range. In addition, condition monitoring sensor 70 may be a sensor that measures waveform data of a shaft rotation speed, load torque, or motor power. Since such waveform data is also varied in accordance with abnormality of an object, whether or not abnormality has occurred can be determined based on the waveform data.

<Fifth Modification>

In the description above, data processing device 80 is provided in wind turbine 10. Data processing device 80, however, may be provided outside wind turbine 10, may receive vibration waveform data measured by condition monitoring sensor 70 through a wired or wireless communication system, and may perform data processing above.

<Sixth Modification>

Database 107 may be provided not inside but outside data processing device 80 and may be able to communicate with data processing device 80 through a wired or wireless communication system. In this case, abnormal part estimator 108 should access database 107 through the communication system.

Data processing device 80 does not have to include abnormal part estimator 108, database 107, second criterion value calculator 109, and output processor 110. In this case, data processing device 80 should output the first criterion value to an external apparatus including abnormal part estimator 108, database 107, second criterion value calculator 109, and output processor 110. Alternatively, a user may check the first criterion value calculated by data processing device 80 and determine whether or not abnormality has occurred in gearbox 40.

<Seventh Modification>

In the description above, second criterion value calculator 109 calculates as the second criterion value, the sum of the first criterion value in the map of interest for which identification information has been extracted by abnormal part estimator 108 and the first criterion value in the map of interest for which identification information has not been extracted and in which the corresponding first criterion value exceeds the third threshold value. Second criterion value calculator 109, however, may calculate as the second criterion value, the sum of the first criterion values in the map of interest for which identification information has been extracted by abnormal part estimator 108. This feature is effective for an object where abnormality of which origin is unknown is less likely to occur.

<Eighth Modification>

Output processor 110 may have a display (display apparatus) of a terminal device show a screen showing estimation result information generated by abnormal part estimator 108.

Figure 21:
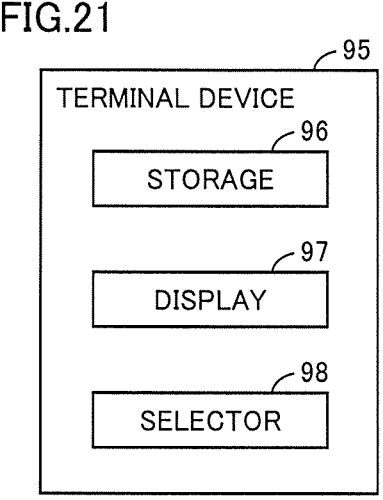
FIG. 21 is a schematic block diagram showing a configuration of a terminal device.

FIG. 21 is a schematic block diagram showing a configuration of a terminal device. Data processing device 80, condition monitoring sensor 70, and a terminal device 95 shown in FIG. 21 constitute a condition monitoring system. Terminal device 95 includes a CPU and a ROM that stores a processing program and a RAM that temporarily stores data, and further includes an input and output port for input and output of various signals (none of which is shown). Terminal device 95 performs various types of data processing in accordance with a program stored in the ROM. As shown in FIG. 21, terminal device 95 includes a storage 96, a display 97, and a selector 98.

Storage 96 stores a frequency spectrum or estimation result information obtained from data processing device 80. Display 97 is implemented, for example, by a touch panel or a liquid crystal display. Selector 98 changes a screen shown on display 97 in response to an input instruction from a user.

Figure 22:
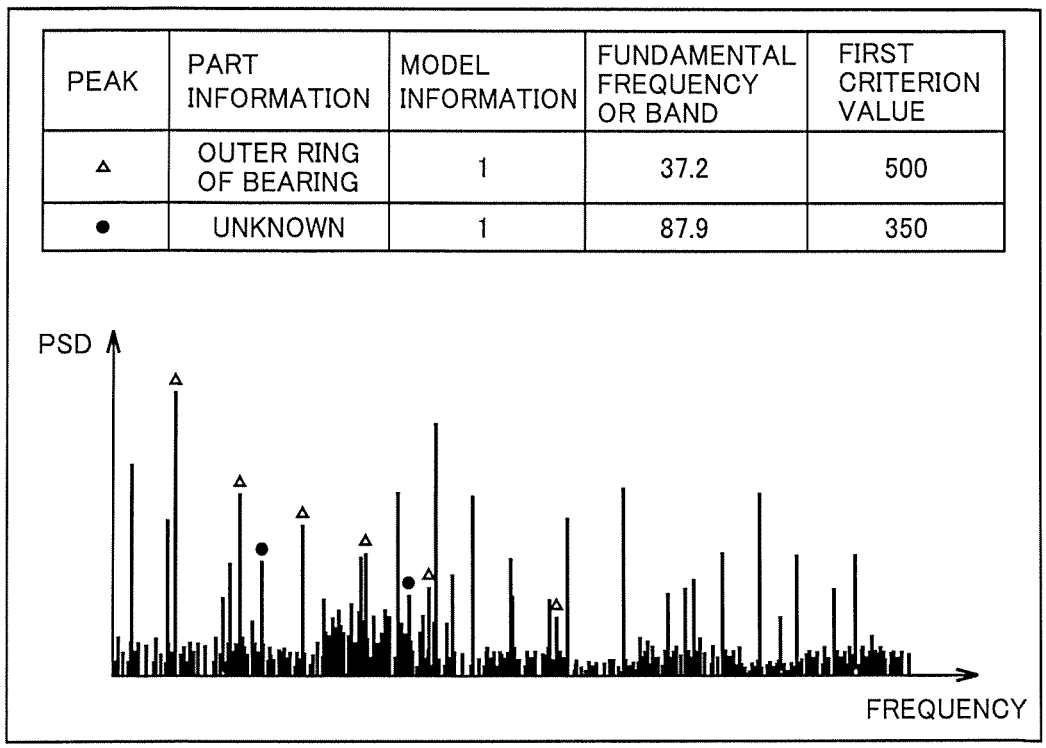
FIG. 22 is a diagram showing an exemplary screen shown on a display of the terminal device.

FIG. 22 is a diagram showing an exemplary screen shown on display 97 of terminal device 95. As shown in FIG. 22, selector 98 has display 97 show a table showing estimation result information and a graph showing at least a part of a frequency spectrum obtained by frequency analyzer 102. The user (operator) can thus check a result of analysis obtained from a vibration waveform measured by condition monitoring sensor 70.

As shown in FIG. 22, selector 98 causes a portion of an abnormal peak in the frequency spectrum corresponding to an abnormality map selected from among a plurality of abnormality maps to be shown in a display format different from that for a remaining portion. In the example shown in FIG. 22, selector 98 has one selected abnormality map shown with a white triangular mark and has another selected abnormality map shown with a black circular mark. The abnormal peak corresponding to the selected abnormality map is thus emphasized so that a user can readily know magnitude of an abnormal peak corresponding to the selected abnormality map.

Selector 98 accepts an instruction for selecting an abnormality map from a user. For example, selector 98 can accept the first criterion value, the part information, and the model information from a drop-down list, and selects an abnormality map in response to an input instruction. For example, selector 98 selects an abnormality map where the first criterion value is equal to or greater than 500, an abnormality map where part information indicates "unknown", or an abnormality map where the model information is set to "1".

Alternatively, selector 98 may automatically select an abnormality map. For example, selector 98 automatically selects an abnormality map highest in first criterion value. Alternatively, selector 98 may automatically select an abnormality map including specific model information.

In the example shown in FIG. 22, a display format is made different by providing a selected abnormality map with a mark. A method of making a display format different, however, is not limited as such. For example, a color, a thickness of a line, or a type of a line (a dashed line or a dotted line) may be different between a portion of an abnormal peak corresponding to the selected abnormality map and a remaining portion.

Figure 23:
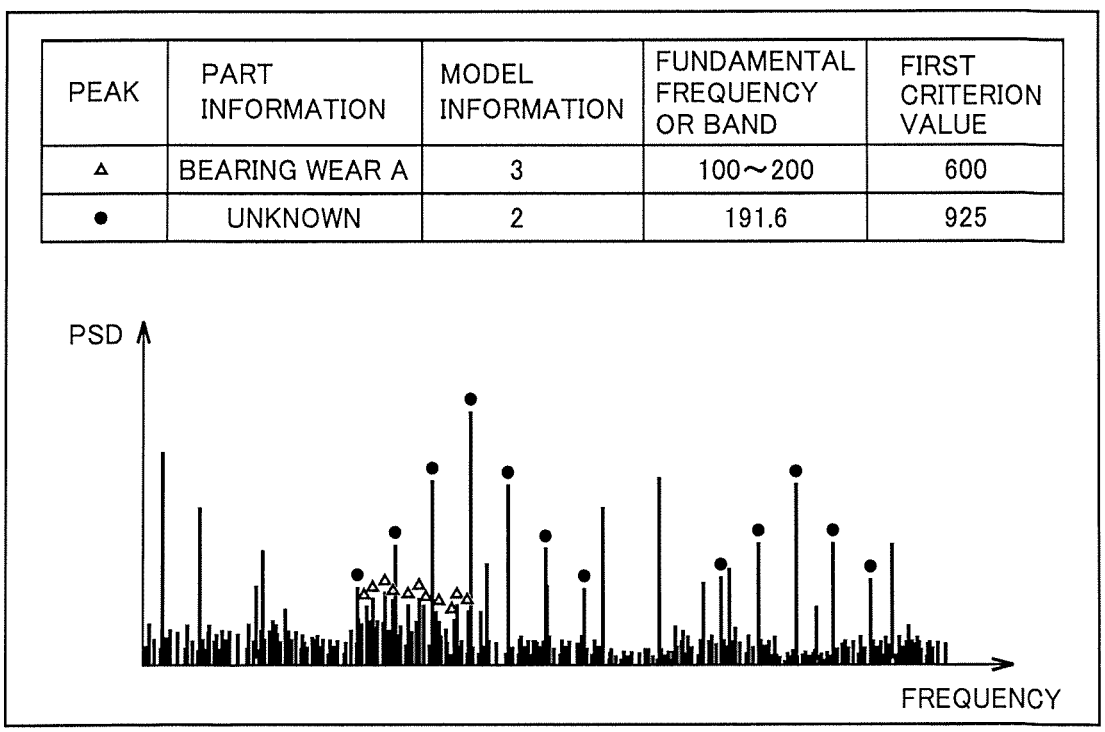
FIG. 23 is a diagram showing another exemplary screen shown on the display of the terminal device.

FIG. 23 is a diagram showing another exemplary screen shown on display 97 of terminal device 95. As shown in FIG. 23, selector 98 may remove an abnormal peak in a frequency spectrum corresponding to the abnormality map selected from among a plurality of abnormality maps. In the example shown in FIG. 23, an abnormal peak corresponding to an abnormality map where the model information is set to "1" has been removed.

Figure 24:
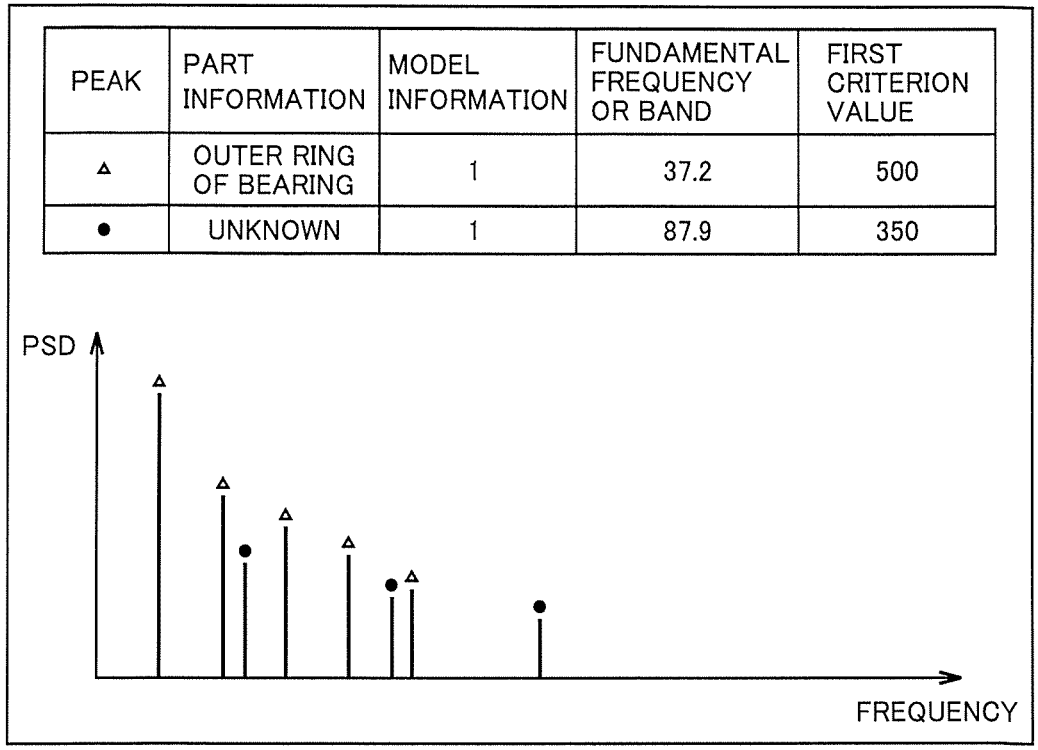
FIG. 24 is a diagram showing yet another exemplary screen shown on the display of the terminal device.

FIG. 24 is a diagram showing yet another exemplary screen shown on display 97 of terminal device 95. As shown in FIG. 24, selector 98 may have only an abnormal peak in a frequency spectrum corresponding to an abnormality map selected from among a plurality of abnormality maps shown. In the example shown in FIG. 24, selector 98 has only an abnormal peak corresponding to the abnormality map where the model information is set to "1" shown. Data in the frequency spectrum other than the abnormal peak corresponding to the abnormality map where the model information is set to "1" has been removed.

In the screen shown in FIGS. 22 to 24, even though harmonics and sidebands in a plurality of abnormality maps are intricate, an abnormal peak corresponding to a selected abnormality map can be emphasized or removed. A user is thus able to more readily determine whether or not abnormality has occurred.

Selector 98 makes a display format of a specific abnormal peak different, removes a specific abnormal peak, or removes data other than a specific abnormal peak as below.

Figure 25:
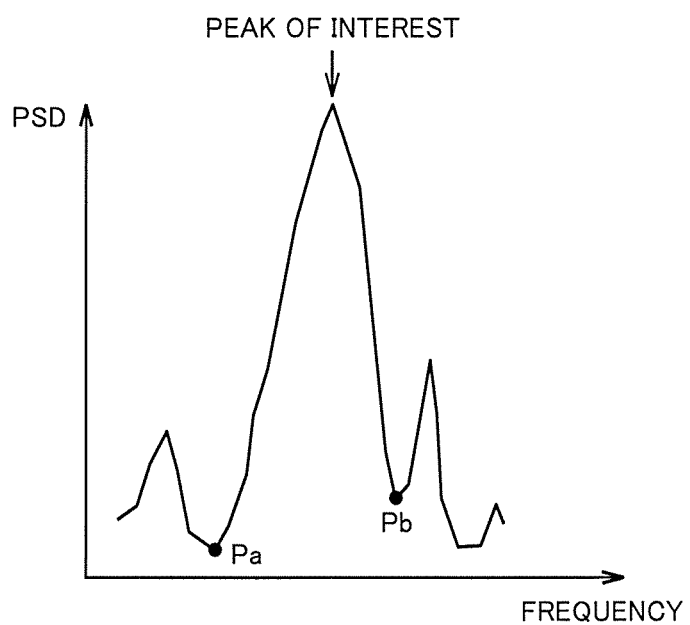
FIG. 25 is a diagram showing a frequency spectrum in the vicinity of an abnormal peak.

FIG. 25 is a diagram showing a frequency spectrum in the vicinity of an abnormal peak. Selector 98 specifies unit data Pa highest in frequency from pieces of unit data having a frequency lower than an abnormal peak corresponding to the selected abnormality map and having a PSD at a relative minimum value. Selector 98 specifies unit data Pb lowest in frequency from pieces of unit data having a frequency higher than the abnormal peak corresponding to the selected abnormality map and having a PSD at a relative minimum value.

Figure 26:
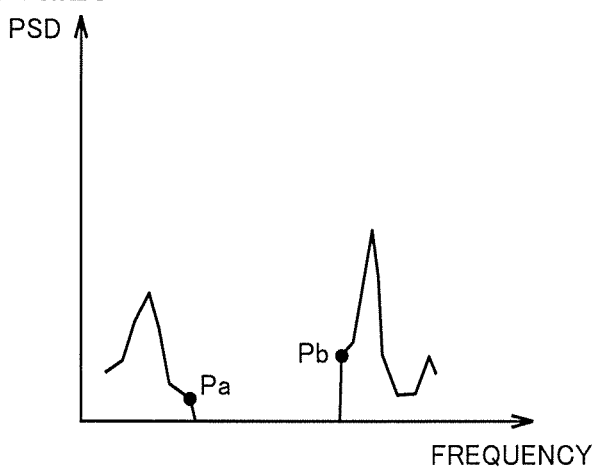
FIG. 26 is a diagram showing an exemplary method of removing an abnormal peak.
Figure 27:
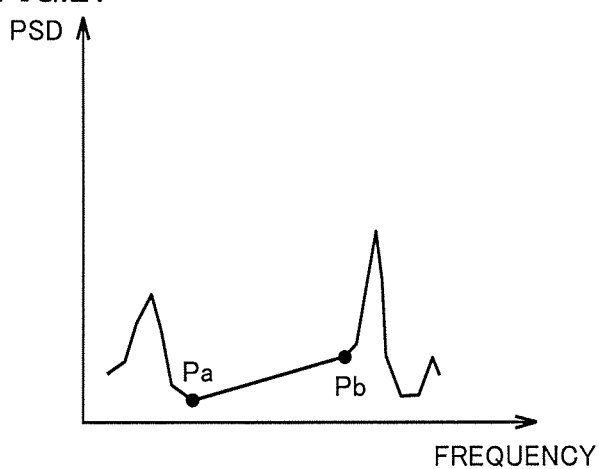
FIG. 27 is a diagram showing another example of removal of an abnormal peak.

FIG. 26 is a diagram showing an exemplary method of removing an abnormal peak. FIG. 27 is a diagram showing another example of removal of an abnormal peak. As shown in FIG. 26, selector 98 removes an abnormal peak by setting a PSD between specified pieces of unit data Pa and Pb to zero. Alternatively, as shown in FIG. 27, selector 98 may remove an abnormal peak by connecting specified pieces of unit data Pa and Pb by a line segment.

Figure 28:
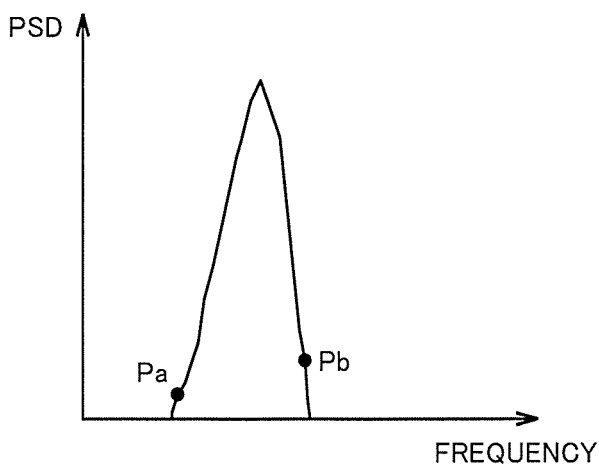
FIG. 28 is a diagram showing an exemplary method of removing data other than an abnormal peak.

FIG. 28 is a diagram showing an exemplary method of removing data other than an abnormal peak. As shown in FIG. 28, selector 98 sets a PSD in a region other than a region between specified pieces of unit data Pa and unit data Pb to zero.

Second Embodiment

A second embodiment will now be described. The present second embodiment relates to an apparatus for measuring vibration of a rotating body such as a bearing or a gear, a condition monitoring system including the same, and a wind turbine including such a condition monitoring system.

<Background Art in Connection with Second Embodiment>

Japanese Patent Laying-Open No. 2013-185507 (PTL 2) discloses a condition monitoring system (CMS) that monitors a condition of a main shaft or a gearbox of a wind turbine. The condition monitoring system includes a plurality of vibration sensors, a monitoring apparatus, and a data server.

The plurality of vibration sensors are fixed to each piece of equipment such as a main bearing, a gearbox, or a generator in a nacelle and measure vibration of each piece of equipment. The monitoring apparatus is provided in the nacelle and receives a detection value from each vibration sensor connected through a cable. The monitoring apparatus transmits measurement data to the data server through a wire or wirelessly. The data server diagnoses abnormality of the wind turbine based on measurement data received from the monitoring apparatus (see PTL 2).

Japanese Patent Laying-Open No. 2015-183628 (PTL 3) discloses a configuration in which a wireless measurement unit including a vibration sensor is attached to a rotating ring (for example, an outer ring) of a main bearing in the condition monitoring system as above. In this condition monitoring system, when there is no appropriate location for attachment of the vibration sensor in a fixed ring (for example, an inner ring) of the main bearing, the wireless measurement unit is attached to the rotating ring. The wireless measurement unit wirelessly communicates with a data acquisition apparatus provided in the nacelle and data measured by the wireless measurement unit is wirelessly transmitted to the data acquisition apparatus (see PTL 3).

<Problem in Connection with Second Embodiment>

If a rotational position of a rotating body (an angle of rotation with respect to a reference position) can be detected, a position of occurrence (a rotational position) of vibration can be specified based on detected vibration data and a cause of abnormality can be analyzed in further detail.

In the condition monitoring system described in PTL 2, the vibration sensor is fixed to a fixed component in the nacelle (an upper surface of a case of a main bearing, a gearbox, or a generator). Therefore, it is difficult to specify a position of occurrence of vibration unless a sensor capable of detecting a rotational position of a rotation shaft is separately provided. Though PTL 3 discloses the configuration where the wireless measurement unit including the vibration sensor is attached to the rotating ring of the main bearing, it does not particularly discuss specifying a position of occurrence of vibration.

An approach to detection of rotation with the use of a proximity sensor or a photoelectric sensor by providing a hole in a circumferential direction in a rotating plate that rotates together with the rotation shaft has been known. With such an approach, however, a rotation speed can be detected but it is difficult to detect a rotational position (phase). According to such an approach, a proximity sensor or a photoelectric sensor should separately be provided in order to detect a rotation speed.

The present second embodiment was made to solve the problems above, and an object thereof is to provide a vibration measurement apparatus capable of detecting a rotational position (an angle of rotation with respect to a reference position) or a rotation speed of a rotating body from vibration data detected by a vibration sensor.

Another object of the present second embodiment is to provide a condition monitoring system capable of detecting a rotational position (an angle of rotation with respect to a reference position) or a rotation speed of a rotating body from vibration data detected by a vibration sensor and a wind turbine including the same.

<Overview of Second Embodiment>

The vibration measurement apparatus according to the present second embodiment is an apparatus for measuring vibration of a rotating body that rotates around a rotation axis with a direction of the rotation axis not being vertical, and includes a vibration detector and a control device. The vibration detector is fixed to the rotating body and wirelessly outputs vibration data detected by sensing an acceleration. The control device obtains at least one of rotation phase information and a rotation speed of the rotating body based on a variation component in vibration data that is varied with a rotation period of the rotating body as the vibration detector is affected by the gravity.

The vibration measurement apparatus may further include a low-pass filter. The low-pass filter extracts the variation component from the vibration data. The control device may obtain at least one of the rotation phase information and the rotation speed by using an output signal from the low-pass filter.

The rotating body may be a rotating structure having a rotation shaft supported by a bearing.

The rotating body may be a rotating ring of the bearing that supports the rotation shaft of the rotating structure.

A condition monitoring system according to the present second embodiment includes the vibration measurement apparatus described above and a monitoring apparatus. The monitoring apparatus monitors a condition of the rotating body by using the vibration data detected by the vibration detector of the vibration measurement apparatus and at least one of the rotation phase information and the rotation speed of the rotating body obtained by the control device of the vibration measurement apparatus.

The control device may detect the rotation phase information and the rotation speed of the rotating body by using the variation component in the vibration data. The condition monitoring system may further include a high-pass filter that removes the variation component from the vibration data. The monitoring apparatus may monitor a condition of the rotating body by analyzing a frequency of the vibration data by using an output signal from the high-pass filter and using a result of frequency analysis and the detected rotation speed as well as the rotation phase information.

A wind turbine according to the present second embodiment includes the condition monitoring system described above.

<Effect of Second Embodiment>

In the vibration measurement apparatus in the present disclosure, the vibration detector is fixed to the rotating body and at least one of rotation phase information and a rotation speed of the rotating body is obtained based on a variation component in the vibration data that is varied with a rotation period of the rotating body as the vibration detector is affected by the gravity. By obtaining the rotation phase information of the rotating body, for example, at which rotational position (phase) of the rotating body vibration has increased can be detected. By obtaining the rotation speed of the rotating body based on the variation component in the vibration data, the rotation speed can be detected without separately providing a sensor for detecting a rotation speed. Therefore, according to the present disclosure, a vibration measurement apparatus capable of detecting a rotational position (an angle of rotation with respect to the reference position) or a rotation speed of a rotating body from vibration data detected by a vibration sensor as well as a condition monitoring system and a wind turbine including the same can be provided.

Detailed Description of Second Embodiment

The present second embodiment will be described below in detail with reference to the drawings. The same or corresponding elements in the drawings have the same reference characters allotted and description thereof will not be repeated.

Figure 29:
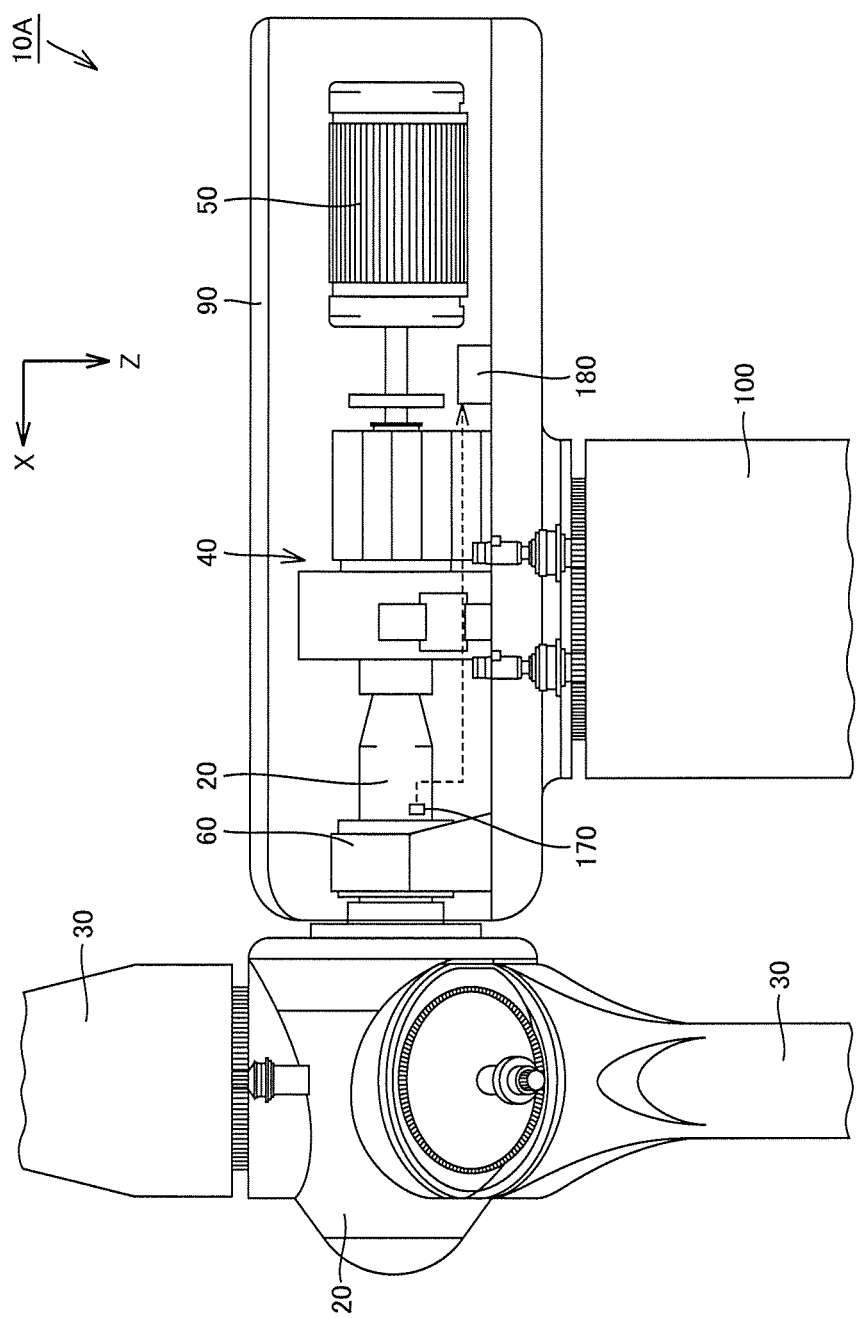
FIG. 29 is a diagram schematically showing a construction of a wind turbine to which a condition monitoring system according to a second embodiment of the present disclosure is applied.

FIG. 29 is a diagram schematically showing a construction of a wind turbine to which the condition monitoring system according to the embodiment of the present disclosure is applied. Referring to FIG. 29, a wind turbine 10A includes main shaft 20, blade 30, gearbox 40, and generator 50. Wind turbine 10A further includes main shaft bearing (which is simply referred to as a "bearing" below) 60, a vibration detector 170, and a data processing device 180. Gearbox 40, generator 50, bearing 60, vibration detector 170, and data processing device 180 are stored in nacelle 90. Nacelle 90 is supported by tower 100.

Main shaft 20 is introduced into nacelle 90 and connected to an input shaft of gearbox 40, and rotatably supported by bearing 60. Main shaft 20 transmits rotational torque generated by blade 30 that receives wind power to the input shaft of gearbox 40. Blade 30 is provided at a tip end of main shaft 20, and converts wind power into rotational torque and transmits rotational torque to main shaft 20.

Gearbox 40 is provided between main shaft 20 and generator 50 and increases a rotation speed of main shaft 20 and outputs the speed to generator 50. By way of example, gearbox 40 is implemented by a step-up gear mechanism including a planetary gear, an intermediate shaft, and a high-speed shaft. Generator 50 is connected to an output shaft of gearbox 40 and generates electric power by rotational torque received from gearbox 40. Generator 50 is implemented, for example, by an induction generator.

Bearing 60 is fixed in nacelle 90 and rotatably supports main shaft 20. Bearing 60 is implemented, for example, by a rolling bearing, and specifically by a spherical rolling bearing, a tapered rolling bearing, a cylindrical rolling bearing, or a ball bearing. Such a bearing may be a single-row bearing or a multiple-row bearing.

Vibration detector 170 is fixed to main shaft 20 and rotates around an axis of main shaft 20 with rotation of main shaft 20. Vibration detector 170 can detect, for example, vibration caused by a damage in the inside of bearing 60 or vibration of main shaft 20 and various members connected thereto (vibration of blade 30 or rubbing at a sealing portion). In this embodiment, in order for vibration detector 170 to sense also vibration of bearing 60 as much as possible, vibration detector 170 is provided at a position as close as possible to bearing 60.

Vibration detector 170 is capable of detecting vibration by sensing an acceleration and also capable of detecting acceleration of gravity. Vibration detector 170 wirelessly transmits detected vibration data to data processing device 180. Therefore, vibration detector 170 includes a vibration sensor and an antenna (not shown) for transmitting vibration data detected by the vibration sensor to data processing device 180.

Data processing device 180 includes a central processing unit (CPU), a read only memory (ROM) that stores a processing program, a random access memory (RAM) that temporarily stores data, and an input and output port for input and output of various signals (none of which is shown). Data processing device 180 wirelessly receives vibration data detected by vibration detector 170 from vibration detector 170. Therefore, data processing device 180 includes an antenna (not shown) for receiving vibration data transmitted from vibration detector 170. Data processing device 180 performs prescribed data processing (which will be described later) in accordance with a program stored in the ROM. Processing performed by data processing device 180 is not limited to software processing and can be performed by dedicated hardware (electronic circuits).

In the condition monitoring system according to the embodiment, vibration detector 170 (vibration sensor) is fixed to main shaft 20 of the rotating body. The reason why vibration detector 170 is provided in the rotating body is to detect a rotation phase (an angle of rotation) or a rotation speed of main shaft 20 by using detection data from vibration detector 170. If a rotation phase of main shaft 20 can be detected by using detection data from vibration detector 170, a position of occurrence of vibration (a phase) can be specified and a cause of abnormality can be analyzed in further detail as described above. When the vibration sensor is provided in a fixed component (for example, the upper surface of the case of bearing 60), it is difficult to specify a position of occurrence of vibration (phase) unless a sensor capable of detecting a rotational position of main shaft 20 is separately provided. If a rotation speed of main shaft 20 can be detected by using detection data from vibration detector 170, a sensor for detecting a rotation speed (a proximity sensor or a photoelectric sensor) does not have to separately be provided.

In the condition monitoring system according to the embodiment, vibration detector 170 is fixed to main shaft 20 of the rotating body as described above. Data processing device 180 obtains rotation phase information and a rotation speed of main shaft 20 based on a variation component in detection data varied with a rotation period of main shaft 20 as vibration detector 170 is affected by gravity. The rotation phase information refers, for example, to a rotation phase (an angle of rotation) of main shaft 20 with respect to a prescribed reference position. Data processing device 180 detects a rotation period of main shaft 20 based on the variation component and detects a rotation speed of main shaft 20 based on the detected rotation period. Thus, for example, at which rotational position (phase) of main shaft 20 vibration has increased can be detected. A rotation speed can be detected without separately providing a sensor (a proximity sensor or a photoelectric sensor) for detecting a rotation speed of main shaft 20, which will be described below in detail.

Figure 30:
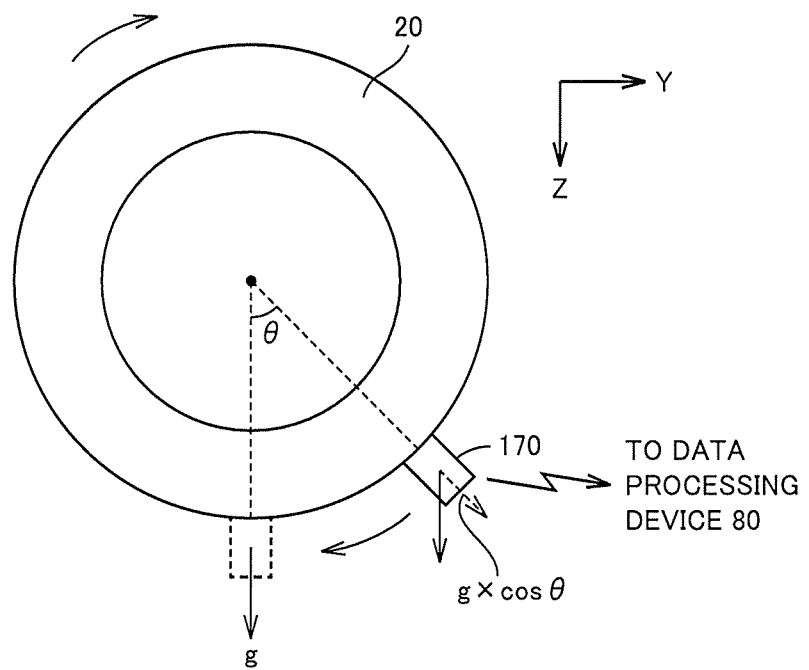
FIG. 30 is a diagram showing installation of a vibration detector.

FIG. 30 is a diagram showing installation of vibration detector 170. FIG. 30 shows a cross-section perpendicular to the rotation axis of main shaft 20. In the figure, a Z axis defines an axis extending in a vertical direction. Referring to FIG. 30, vibration detector 170 is fixed to an outer circumferential surface of main shaft 20 and rotates around the axis of main shaft 20 with rotation of main shaft 20.

Vibration detector 170 (vibration sensor) detects vibration (acceleration) in a direction perpendicular to a surface where it is installed (a radial direction of main shaft 20). Vibration detector 170 detects vibration by sensing an acceleration and detects also an acceleration of gravity. A detection value from vibration detector 170 is affected by gravity and influence by gravity onto the detection value from vibration detector 170 is different depending on a rotational position (phase) of main shaft 20. Specifically, influence by gravity onto a detection value at the time when vibration detector 170 is located at a position displaced by an angle θ from the lowest point of main shaft 20 is expressed as g×cos θ, where g represents influence by gravity onto a detection value from vibration detector 170 at the time when vibration detector 170 is located at a lowest point of main shaft 20.

The detection value from vibration detector 170 is thus varied with a rotation period of main shaft 20 by being affected by gravity. Data processing device 180 (FIG. 29) extracts from vibration data, a component varied with a rotation period of main shaft 20 by filtering the vibration data detected by vibration detector 170 and obtains rotation phase information of main shaft 20 based on the extracted data.

In the embodiment, data processing device 180 subjects vibration data detected by vibration detector 170 to frequency analysis. By performing frequency analysis of vibration data, for example, at which part (an outer ring raceway surface or a rolling element) of bearing 60 abnormality has occurred can be diagnosed. Abnormality diagnosis based on frequency analysis requires a rotation speed of the rotating body (main shaft 20). In the embodiment, data processing device 180 detects a rotation speed of main shaft 20 based on data of the variation component varied with the rotation period of main shaft 20. Thus, abnormality diagnosis based on frequency analysis can be conducted by obtaining a rotation speed of the rotating body (main shaft 20) where vibration detector 170 is provided without separately providing a rotation speed sensor and by using the obtained rotation speed.

Figure 31:
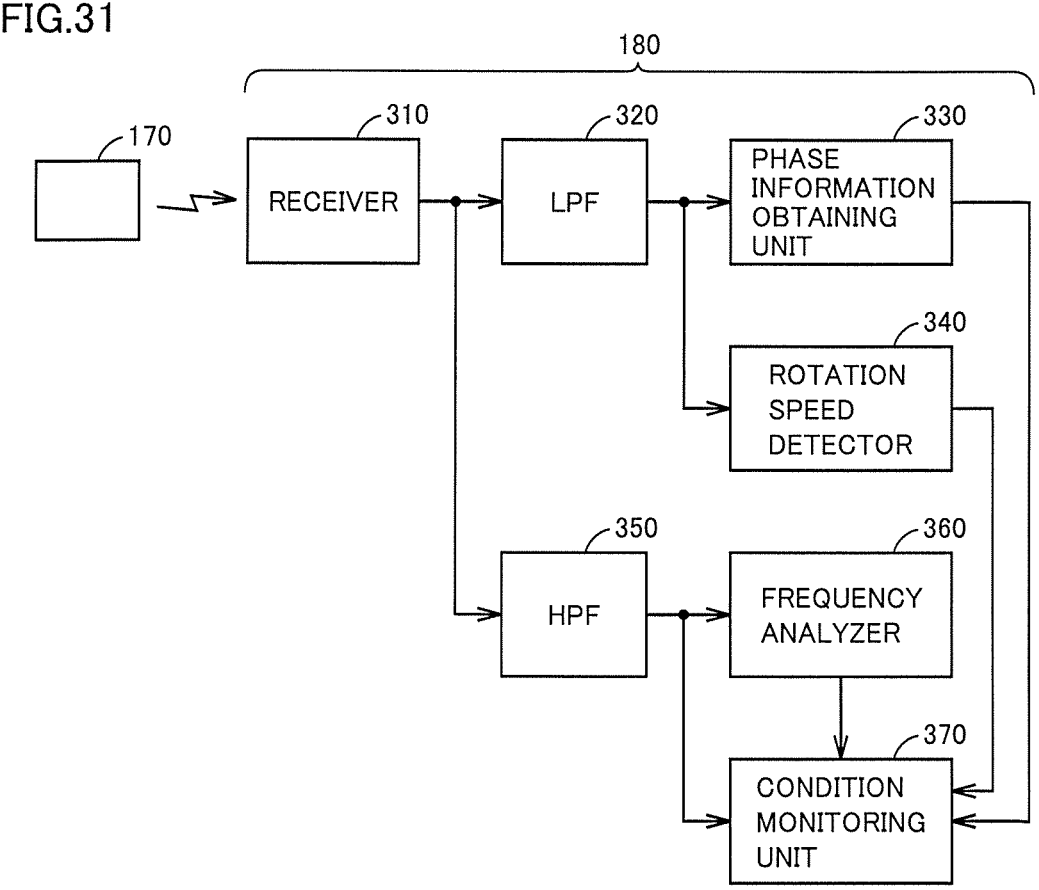
FIG. 31 is a functional block diagram showing a configuration of a data processing device shown in FIG. 29.

FIG. 31 is a functional block diagram showing a configuration of data processing device 180 shown in FIG. 29. Referring to FIG. 31, data processing device 180 includes a receiver 310, a low-pass filter (which is referred to as an "LPF" below) 320, a phase information obtaining unit 330, a rotation speed detector 340, a high-pass filter (which is referred to as an "HPF" below) 350, a frequency analyzer 360, and a condition monitoring unit 370.

Receiver 310 wirelessly receives vibration data detected by vibration detector 170 from vibration detector 170. LPF 320 receives the vibration data received by receiver 310 from receiver 310. LPF 320 allows a signal component lower than a prescribed frequency in the received vibration data to pass therethrough and cuts off a high-frequency component. LPF 320 is provided to extract a component varied with the rotation period of main shaft 20 from the vibration data detected by vibration detector 170.

Figure 32:
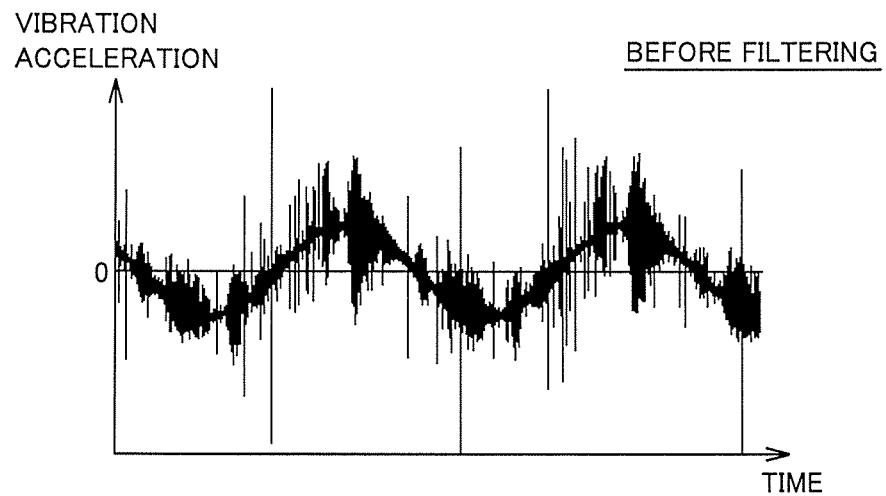
FIG. 32 is a diagram showing exemplary vibration data received by a receiver.
Figure 33:
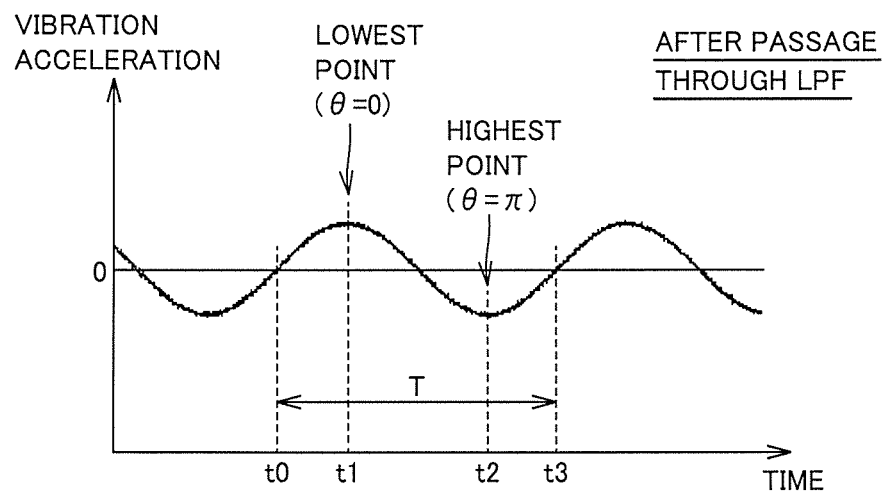
FIG. 33 is a diagram showing data after the vibration data shown in FIG. 32 has passed through an LPF.

FIG. 32 is a diagram showing exemplary vibration data received by receiver 310. A vibration waveform shown in FIG. 32 is a vibration waveform before passage through LPF 320. FIG. 33 is a diagram showing data after the vibration data shown in FIG. 32 has passed through LPF 320. In FIGS. 32, 33, the abscissa represents time and the ordinate represents a vibration acceleration representing magnitude of vibration.

Referring to FIG. 32, vibration data before passage through LPF 320 is such vibration data that a low-frequency vibration waveform varied with the rotation period of main shaft 20 where vibration detector 170 is provided is superimposed on a high-frequency vibration waveform.

Referring to FIG. 33, as vibration data received by receiver 310 passes through LPF 320, a component varied with the rotation period of main shaft 20 is extracted. A relative maximum point (at time t1) of the waveform corresponds to a time point when vibration detector 170 is located at the lowest point (θ=0) of main shaft 20. A relative minimum point (at time t2) of the waveform corresponds to a time point when vibration detector 170 is located at the highest point (θ=π) of main shaft 20. A rotational position (phase) of vibration detector 170 can thus be detected based on a waveform obtained after passage through LPF 320, and phase information (angle of rotation) of main shaft 20 where vibration detector 170 is provided can be obtained based on a result of detection.

A time period from time t0 to t3 corresponds to a rotation period T of main shaft 20. A rotation speed of main shaft 20 can be calculated based on rotation period T. A rotation speed of main shaft 20 can thus also be detected based on a waveform obtained after passage through LPF 320.

Referring again to FIG. 31, phase information obtaining unit 330 receives an output signal from LPF 320 and obtains phase information (angle of rotation) of main shaft 20 where vibration detector 170 is provided based on the received signal. Specifically, phase information obtaining unit 330 detects a relative maximum point of the output signal from LPF 320, for example, as shown in FIG. 33, and obtains phase information (angle of rotation) with the relative maximum point being defined as the reference position (a phase angle of 0). Alternatively, phase information obtaining unit 330 may detect a relative minimum point of the output signal from LPF 320 and obtain phase information (angle of rotation) with the relative minimum point being defined as the reference position (a phase angle of 0). Then, phase information obtaining unit 330 outputs the obtained phase information to condition monitoring unit 370.

Rotation speed detector 340 detects a rotation speed of main shaft 20 where vibration detector 170 is provided based on an output signal from LPF 320. Specifically, rotation speed detector 340 detects rotation period T of main shaft 20 based on the output signal from LPF 320 as shown, for example, in FIG. 33, and calculates the rotation speed of main shaft 20 based on detected rotation period T. Rotation speed detector 340 then outputs the detected rotation speed to condition monitoring unit 370.

HPF 350 receives vibration data received by receiver 310 from receiver 310. Then, HPF 350 allows a signal component higher than a prescribed frequency of the received vibration data to pass therethrough and cuts off a low-frequency component. HPF 350 is provided to extract an actual vibration component by eliminating a component varied with the rotation period of main shaft 20 from the vibration data detected by vibration detector 170.

Figure 34:
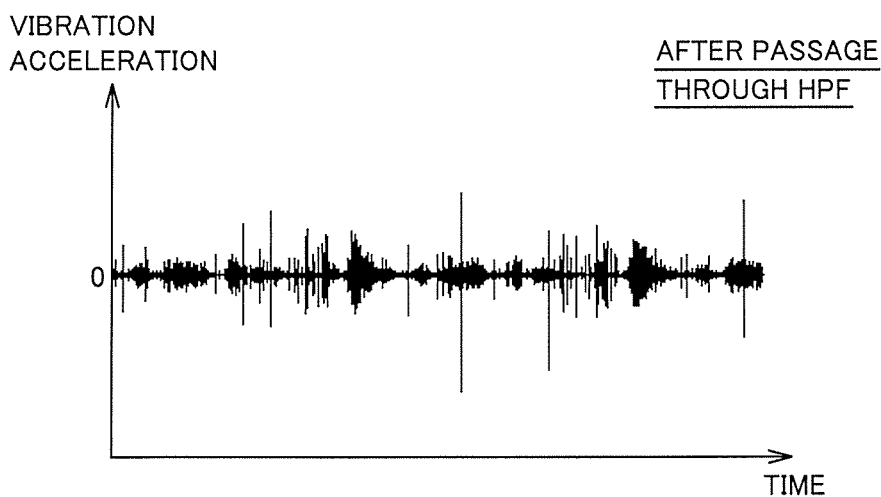
FIG. 34 is a diagram showing data after the vibration data shown in FIG. 32 has passed through an HPF.

FIG. 34 is a diagram showing data after the vibration data shown in FIG. 32 has passed through HPF 350. In FIG. 34 as well, the abscissa represents time and the ordinate represents a vibration acceleration representing magnitude of vibration.

Referring to FIG. 34, as vibration data received by receiver 310 passes through HPF 350, a component varied with the rotation period of main shaft 20 is removed and an actual vibration component is extracted. With this vibration component data, frequency analyzer 360 which will be described later analyzes a frequency of vibration and condition monitoring unit 370 diagnoses abnormality.

Referring again to FIG. 31, frequency analyzer 360 receives an output signal from HPF 350. Frequency analyzer 360 then subjects the output signal from HPF 350 to frequency analysis and outputs a result of frequency analysis to condition monitoring unit 370. By way of example, frequency analyzer 360 subjects the output signal from HPF 350 to fast Fourier transform (FFT) and outputs a peak frequency exceeding a threshold value set in advance to condition monitoring unit 370.

Condition monitoring unit 370 receives a result of frequency analysis from frequency analyzer 360 and receives an output signal from HPF 350. Condition monitoring unit 370 receives phase information obtained by phase information obtaining unit 330 from phase information obtaining unit 330 and receives a rotation speed detected by rotation speed detector 340 from rotation speed detector 340. Condition monitoring unit 370 then diagnoses abnormality based on the result of frequency analysis and the rotation speed. For example, when the inside of bearing 60 is damaged, a peak of vibration is produced at a specific frequency theoretically determined based on a geometric structure in the bearing and the rotation speed, in accordance with a damaged part (the inner ring, the outer ring, or the rolling element). Condition monitoring unit 370 estimates the damaged part of bearing 60 based, for example, on the result of frequency analysis by frequency analyzer 360 and the rotation speed received from rotation speed detector 340.

Condition monitoring unit 370 estimates at which rotational position (phase) of main shaft 20 abnormality has occurred based on phase information received from phase information obtaining unit 330. For example, condition monitoring unit 370 associates vibration data with vibration at the estimated damaged part of bearing 60 and estimates a position of occurrence (a rotation phase) of the damaged part by further associating the vibration data with phase information. More accurate abnormality diagnosis that allows estimation also of a position of occurrence of abnormality can thus be conducted.

Though not shown in particular, abnormality of vibration at a low frequency (close to a rotation frequency of main shaft 20) may be diagnosed by subjecting also an output signal from LPF 320 to frequency analysis and using a result of frequency analysis and a rotation speed detected by rotation speed detector 340.

Though condition monitoring unit 370 is provided in data processing device 180 in nacelle 90, various types of data input to condition monitoring unit 370 may wirelessly be transmitted to a server on the ground and condition monitoring unit 370 may be provided in the server.

As set forth above, in the embodiment, vibration detector 170 is fixed to main shaft 20 of the rotating body and information on a rotation phase of main shaft 20 is obtained based on a variation component in vibration data varied with a rotation period of main shaft 20 as vibration detector 170 is affected by gravity. Therefore, according to the embodiment, for example, at which rotational position (phase) of main shaft 20 vibration has increased can be detected.

In the embodiment, a rotation speed of main shaft 20 is detected based on data on a variation component varied with a rotation period of main shaft 20. Thus, a rotation speed of main shaft 20 where vibration detector 170 is provided can be obtained without separately providing a rotation speed sensor and abnormality diagnosis based on frequency analysis can be conducted by using the obtained rotation speed.

[Modification]

Figure 35:
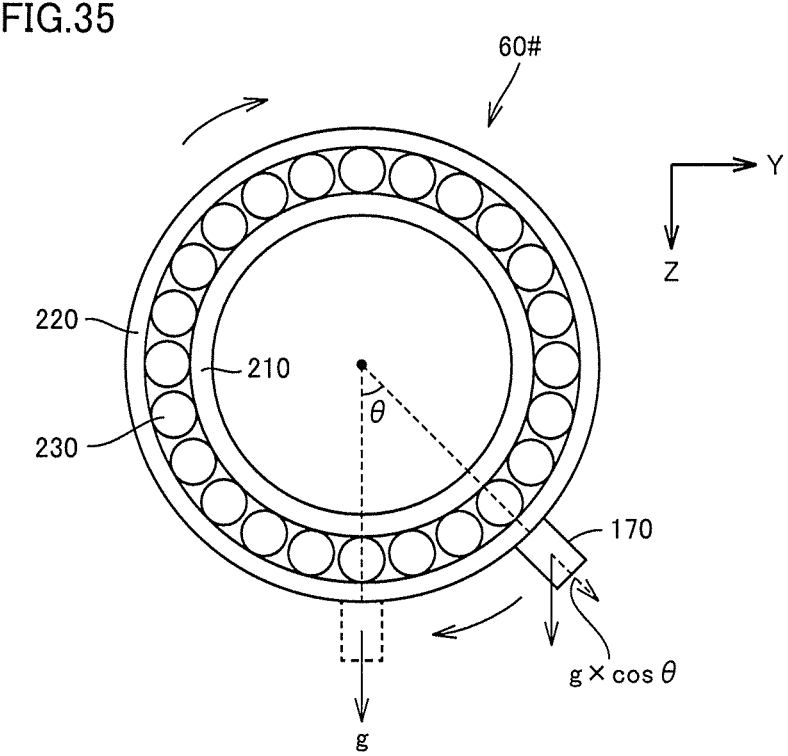
FIG. 35 is a diagram showing installation of a vibration detector in a bearing.

Though vibration detector 170 is fixed to main shaft 20 in the embodiment above, a location of installation of vibration detector 170 is not limited as such. For example, as shown in FIG. 35, vibration detector 170 may be fixed to an outer circumferential surface of an outer ring which is a rotating ring in a bearing 60# in which an inner ring and the outer ring are defined as a fixed ring and a rotating ring, respectively.

By taking vibration data detected by vibration detector 170 into data processing device 180, a damaged part in equipment of which vibration is measured by vibration detector 170 can be specified and a position of occurrence thereof (rotation phase) can be estimated.

Figure 36:
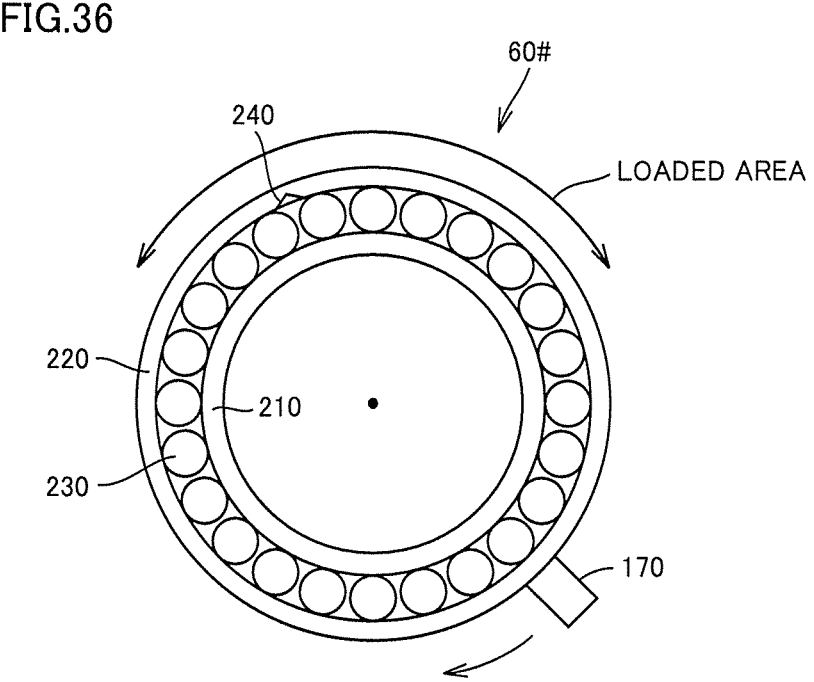
FIG. 36 is a diagram showing damage caused in a bearing.

FIG. 36 is a diagram showing damage 240 caused in bearing 60#. Referring to FIG. 36, bearing 60# includes an inner ring 210, an outer ring 220, and a plurality of rolling elements 230. In bearing 60#, inner ring 210 is a fixed ring and outer ring 220 is a rotating ring. Vibration detector 170 is fixed to an outer circumferential surface of outer ring 220 and rotates around an axis with rotation of outer ring 220.

As illustrated, for example, when damage 240 is caused in an inner circumferential surface of outer ring 220 which is the rotating ring, occurrence of damage in the inner circumferential surface of the outer ring can be specified by conducting frequency analysis. Vibration becomes greater while damage 240 is passing through a loaded area. Therefore, a position (rotation phase) of damage 240 can also be estimated based on phase information obtained by phase information obtaining unit 330 (FIG. 31).

Thus, according to the modification, further detailed abnormality diagnosis of bearing 60# can be conducted.

Though rotation phase information and a rotation speed of main shaft 20 are obtained based on vibration data in the embodiment and the modification above, the present disclosure is not limited to obtaining both of the rotation phase information and the rotation speed, and any one of the rotation phase information and the rotation speed may be obtained based on vibration data.

Though vibration detector 170 is provided in main shaft 20 or bearing 60# in the above, vibration detector 170 may be provided in another rotating body (a gear or a bearing thereof). Since influence by gravity should appear in a detection value from vibration detector 170, a direction of the rotation axis of the rotating body where vibration detector 170 is provided should not be vertical.

As set forth above, the second embodiment includes the disclosure as below.

(Configuration 1)

An apparatus for measuring vibration of a rotating body that rotates around a rotation axis with a direction of the rotation axis not being vertical, the apparatus comprising:

a vibration detector fixed to the rotating body, the vibration detector wirelessly outputting vibration data detected by sensing an acceleration; and a control device that obtains at least one of rotation phase information and a rotation speed of the rotating body based on a variation component in the vibration data varied with a rotation period of the rotating body as the vibration detector is affected by gravity.

(Configuration 2)

The apparatus described in configuration 1, the apparatus further comprising a low-pass filter that extracts the variation component from the vibration data, in which the control device obtains at least one of the rotation phase information and the rotation speed by using an output signal from the low-pass filter.

(Configuration 3)

The apparatus described in configuration 1 or 2, in which the rotating body is a rotating structure having a rotation shaft supported by a bearing.

(Configuration 4)

The apparatus described in configuration 1 or 2, in which the rotating body is a rotating ring of a bearing that supports a rotation shaft of a rotating structure.

(Configuration 5)

A condition monitoring system comprising:

the apparatus for measuring vibration described in configuration 1; and a monitoring apparatus that monitors a condition of the rotating body by using vibration data detected by the vibration detector of the apparatus for measuring vibration and at least one of rotation phase information and a rotation speed of the rotating body obtained by the control device of the apparatus for measuring vibration.

(Configuration 6)

The condition monitoring system described in configuration 5, in which the control device detects the rotation phase information and the rotation speed by using the variation component in the vibration data, the condition monitoring system further comprises a high-pass filter that removes the variation component from the vibration data, and the monitoring apparatus monitors a condition of the rotating body by subjecting the vibration data to frequency analysis by using an output signal from the high-pass filter and using a result of frequency analysis and the detected rotation speed and rotation phase information.

(Configuration 7)

A wind turbine comprising the condition monitoring system described in configuration 5 or 6.

The disclosure in the present second embodiment can be combined with the disclosure in the first embodiment. The wind turbine in the first embodiment may include vibration detector 170 in the second embodiment as condition monitoring sensor 70 shown in FIG. 1 and may further include data processing device 180 in the second embodiment. Vibration detector 170 outputs the detected vibration data to data processing device 80 and data processing device 180. A criterion value for accurately determining whether or not abnormality has occurred in an object can thus be calculated and a rotational position (an angle of rotation with respect to a reference position) or a rotation speed of the rotating body can be detected based on vibration data.

Third and Fourth Embodiments

Third and fourth embodiments will now be described. The present third embodiment relates to a condition monitoring system and a wind turbine including the same, and particularly to a condition monitoring system that monitors a condition of facilities by measuring vibration of the facilities and a wind turbine including the same.

<Background Art in Connection with Third and Fourth Embodiments>

Japanese Patent Laying-Open No. 2017-26514 (PTL 4) discloses an abnormality diagnosis apparatus included in a wind turbine. The abnormality diagnosis apparatus includes a vibration sensor and a control device. The vibration sensor is attached to a measurement target and detects vibration of the measurement target. The control device determines whether or not the vibration sensor has been detached from the measurement target based on data received from the vibration sensor. The abnormality diagnosis apparatus can thus sense detachment of the vibration sensor from the measurement target (see PTL 4).

<Problems in Connection with Third and Fourth Embodiments>

Since the abnormality diagnosis apparatus described in PTL 4 can sense detachment of a vibration sensor from a measurement target based on data received from the vibration sensor, it is useful in a wind turbine where a checking operation in the field is not easy because of installation at a high location. Though the abnormality diagnosis apparatus described in PTL 4 is able to sense detachment of the vibration sensor from the measurement target, it is unable to sense abnormality of a main body of the vibration sensor.

Therefore, an object of the present third and fourth embodiments is to allow abnormality diagnosis of a main body of a vibration detector based on an output from the vibration detector in a condition monitoring system that monitors a condition of facilities by measuring vibration of the facilities and a wind turbine including the same.

<Overview of Third and Fourth Embodiments>

A condition monitoring system in the present third and fourth embodiments is a condition monitoring system that monitors a condition of facilities by measuring vibration of the facilities, and the condition monitoring system includes a vibration detector, a voltage processing circuit, a monitoring apparatus, and a connection circuit. The vibration detector outputs vibration detected by sensing an acceleration generated in the facilities as voltage variation from a bias voltage. The voltage processing circuit removes the bias voltage from an output voltage from the vibration detector. The monitoring apparatus monitors a condition of the facilities based on an output from the voltage processing circuit. The connection circuit connects an output of the vibration detector to the monitoring apparatus without the voltage processing circuit being interposed. The monitoring apparatus diagnoses the vibration detector as being abnormal when an output voltage received through the connection circuit is not included in a prescribed range including the bias voltage.

The connection circuit may include a relay connected in parallel to the voltage processing circuit. The monitoring apparatus may control the relay to be conducting while abnormality of the vibration detector is being diagnosed.

The vibration detector includes a plurality of vibration sensors and the connection circuit may include a multiplexer that connects any one of outputs of the plurality of vibration sensors to an input port of the monitoring apparatus. The monitoring apparatus may control the multiplexer to sequentially connect the outputs of the plurality of vibration sensors to the input port while abnormality of the vibration detector is being diagnosed.

The monitoring apparatus may diagnose abnormality of the vibration detector by activating the connection circuit before monitoring of a condition based on an output from the voltage processing circuit.

A wind turbine in the present third and fourth embodiments includes the condition monitoring system described above.

<Effect of Third and Fourth Embodiments>

In the condition monitoring system in the present third and fourth embodiments, a connection circuit that can connect an output of the vibration detector to the monitoring apparatus without the voltage processing circuit being interposed is provided. When an output voltage received through the connection circuit is not included in a prescribed range including a bias voltage, the vibration detector is diagnosed as being abnormal. According to the condition monitoring system in the present disclosure, abnormality diagnosis of a main body of the vibration detector can be conducted based on an output from the vibration detector.

The present third and fourth embodiments will be described below in detail with reference to the drawings. The same or corresponding elements in the drawings have the same reference characters allotted and description thereof will not be repeated.

Detailed Description of Third Embodiment

Figure 37:
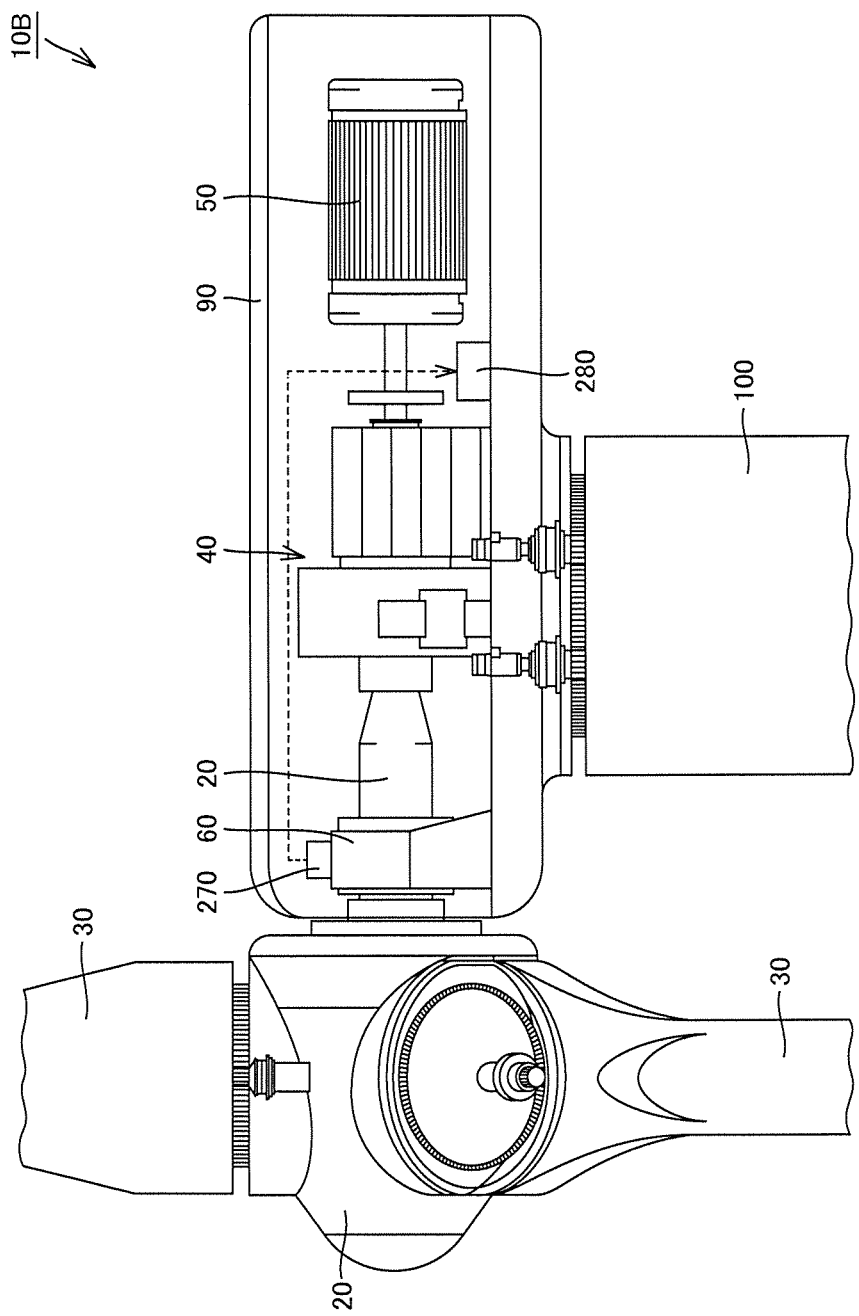
FIG. 37 is a diagram schematically showing a construction of a wind turbine to which a condition monitoring system according to a third embodiment of the present disclosure is applied.

FIG. 37 is a diagram schematically showing a construction of a wind turbine to which the condition monitoring system according to the third embodiment of the present disclosure is applied. Referring to FIG. 37, a wind turbine 10B includes main shaft 20, blade 30, gearbox 40, and generator 50. Wind turbine 10B further includes main shaft bearing (which is simply referred to as a "bearing" below) 60, a vibration detector 270, and a data processing device 280. Gearbox 40, generator 50, bearing 60, vibration detector 270, and data processing device 280 are stored in nacelle 90. Nacelle 90 is supported by tower 100.

Main shaft 20 is introduced into nacelle 90 and connected to an input shaft of gearbox 40, and rotatably supported by bearing 60. Main shaft 20 transmits rotational torque generated by blade 30 that receives wind power to the input shaft of gearbox 40. Blade 30 is provided at a tip end of main shaft 20, and converts wind power into rotational torque and transmits rotational torque to main shaft 20.

Gearbox 40 is provided between main shaft 20 and generator 50 and increases a rotation speed of main shaft 20 and outputs the speed to generator 50. By way of example, gearbox 40 is implemented by a step-up gear mechanism including a planetary gear, an intermediate shaft, and a high-speed shaft. Generator 50 is connected to an output shaft of gearbox 40 and generates electric power by rotational torque received from gearbox 40. Generator 50 is implemented, for example, by an induction generator.

Bearing 60 is fixed in nacelle 90 and rotatably supports main shaft 20. Bearing 60 is implemented, for example, by a rolling bearing, and specifically by a spherical rolling bearing, a tapered rolling bearing, a cylindrical rolling bearing, or a ball bearing. Such a bearing may be a single-row bearing or a multiple-row bearing.

Vibration detector 270 includes a vibration sensor and provided, for example, in bearing 60. Vibration detector 270 detects vibration by means of the vibration sensor fixed to bearing 60 and outputs detected vibration data to data processing device 280. Vibration detector 270 detects vibration by sensing an acceleration and outputs detected vibration as voltage variation from a bias voltage. Vibration detector 270 is implemented, for example, by a piezoelectric acceleration pickup including a piezoelectric element.

Data processing device 280 includes a central processing unit (CPU), a read only memory (ROM) that stores a processing program, a random access memory (RAM) that temporarily stores data, and an input and output port for input and output of a signal (none of which is shown). Data processing device 280 receives vibration data (voltage variation from a bias voltage) detected by vibration detector 270 from vibration detector 270. After the data processing device performs prescribed voltage processing and A/D conversion, the data processing device performs prescribed data processing (frequency analysis) in accordance with a program stored in the ROM.

In wind turbine 10B, vibration detector 270 that detects vibration data for monitoring a condition of wind turbine 10B (mainly bearing 60) is provided in nacelle 90. Since vibration detector 270 is provided at a high location on tower 100 together with nacelle 90, it is not easy to perform in the field, a checking operation as to whether or not abnormality has occurred in vibration detector 270.

In the condition monitoring system according to the third embodiment, a configuration allowing diagnosis as to whether or not abnormality has occurred in vibration detector 270 is provided. Specifically, a voltage checking circuit for checking an output voltage from vibration detector 270 is provided. When an output voltage from vibration detector 270 received through the voltage checking circuit is out of a prescribed normal range, vibration detector 270 is diagnosed as being abnormal. A configuration and processing for allowing diagnosis as to whether or not abnormality has occurred in vibration detector 270 will be described below in detail.

Figure 38:
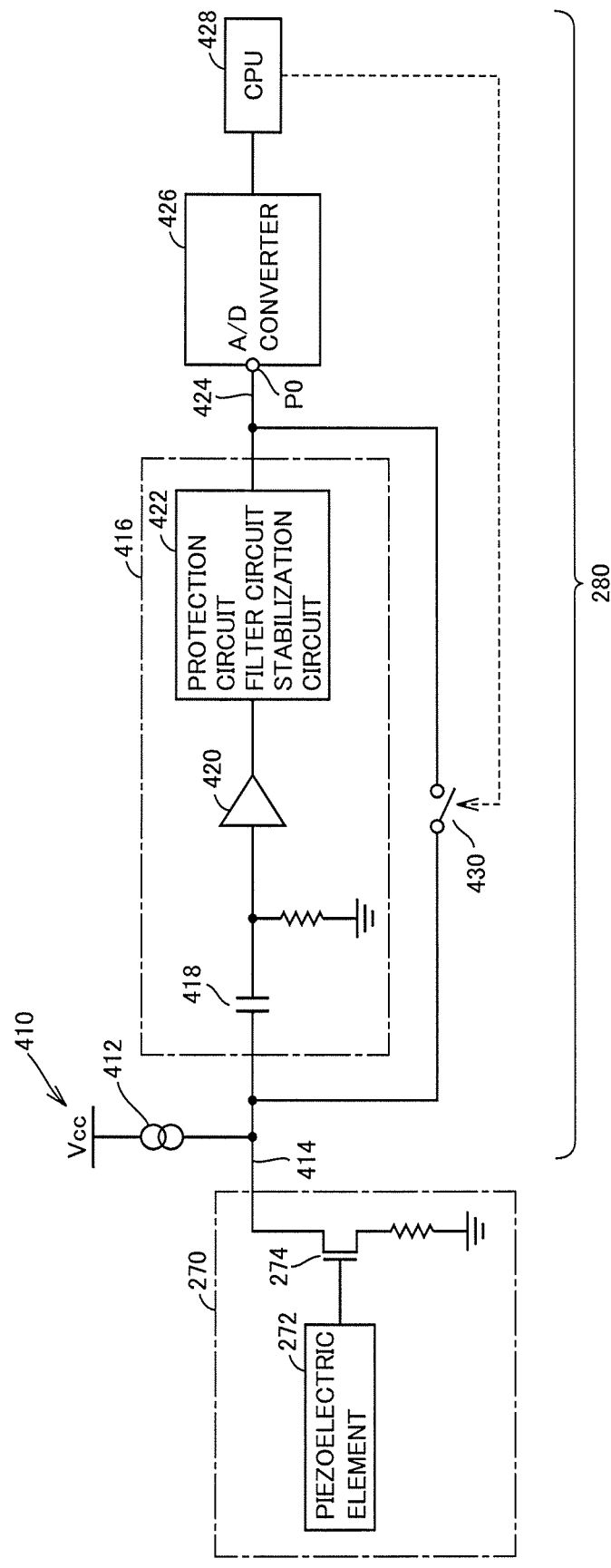
FIG. 38 is a diagram showing a configuration of a vibration detector and a data processing device shown in FIG. 37.

FIG. 38 is a diagram showing a configuration of vibration detector 270 and data processing device 280 shown in FIG. 37. Referring to FIG. 38, vibration detector 270 is implemented by a piezoelectric acceleration pickup and includes a piezoelectric element 272 and a field effect transistor (FET) 274. Piezoelectric element 272 outputs charges in accordance with a vibration acceleration. FET 274 functions as an amplifier that amplifies an output from piezoelectric element 272.

Specifically, a constant current is supplied from a constant current source implemented by a DC power supply 410 and a constant current element 412 (a constant current diode) through an output line 414 to FET 274, which regulates a voltage level on output line 414 to a prescribed bias voltage. FET 274 has a gate connected to an output terminal of piezoelectric element 272 and a gate voltage of FET 274 is varied in accordance with an output from piezoelectric element 272. Variation in gate voltage of FET 274 appears as voltage variation from a bias voltage of output line 414. Thus, vibration detector 270 detects vibration with piezoelectric element 272 and outputs detected vibration to output line 414 as voltage variation from the bias voltage.

Data processing device 280 includes a voltage processing circuit 416, an A/D converter 426, a CPU 428, and a connection circuit 430. Voltage processing circuit 416 includes a capacitor 418, an amplifier 420, and various circuits 422. Capacitor 418 blocks a bias voltage on output line 414 and allows passage only of a variation component in accordance with vibration detected by vibration detector 270.

Amplifier 420 amplifies a variation component (vibration data) that has passed through capacitor 418. Various circuits 422 include a protection circuit, a filter circuit, and a stabilization circuit in order to take data amplified by amplifier 420 into A/D converter 426. A/D converter 426 receives an output voltage from voltage processing circuit 416 at its input port P0, converts a voltage (an analog signal) input through input port P0 into a digital signal, and outputs the digital signal to CPU 428.

Connection circuit 430 is connected in parallel to voltage processing circuit 416 and includes, for example, a relay. Connection circuit 430 has one end connected to output line 414 of vibration detector 270 and the other end connected to an output line 424 of voltage processing circuit 416 connected to input port P0. Connection circuit 430 serves as a voltage checking circuit for checking an output voltage from vibration detector 270, and abnormality of vibration detector 270 can be diagnosed by using connection circuit 430. Connection circuit 430 is controlled by CPU 428 to be conducting while abnormality of vibration detector 270 is being diagnosed, and connects an output of vibration detector 270 to input port P0 of A/D converter 426 without voltage processing circuit 416 being interposed.

CPU 428 monitors various conditions of wind turbine 10B based on an output from voltage processing circuit 416 that is taken in through A/D converter 426. Though not shown in particular, for example, CPU 428 analyzes a frequency of vibration data (vibration waveform) received from A/D converter 426 and monitors for abnormality of bearing 60 based on a result of analysis.

CPU 428 diagnoses abnormality of vibration detector 270 based on an output from vibration detector 270. While abnormality of vibration detector 270 is being diagnosed, CPU 428 controls connection circuit 430 to be conducting. When connection circuit 430 is conducting, a voltage on output line 414 of vibration detector 270 is taken into A/D converter 426 without voltage processing circuit 416 being interposed. When a voltage on output line 414 (an output voltage from vibration detector 270) received through connection circuit 430 is not included in a prescribed range including the bias voltage described above, CPU 428 then diagnoses vibration detector 270 as being abnormal.

Figure 39:
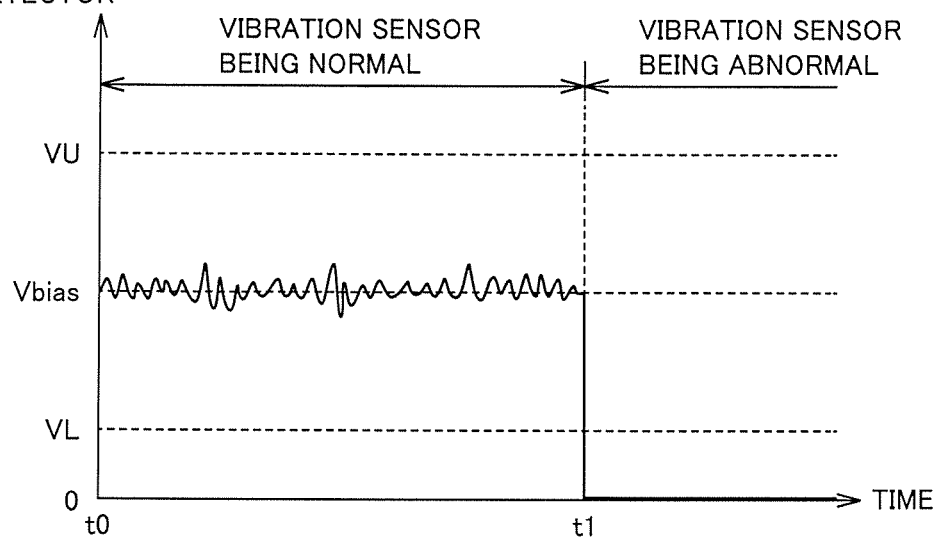
FIG. 39 is a diagram showing exemplary variation in output voltage of the vibration detector.

FIG. 39 is a diagram showing exemplary variation in output voltage from vibration detector 270. Referring to FIG. 39, a voltage Vbias represents a bias voltage. An upper limit value VU is set to a prescribed value higher than voltage Vbias, and when an output voltage from vibration detector 270 exceeds upper limit value VU, vibration detector 270 is diagnosed as being abnormal. A lower limit value VL is set to a prescribed value lower than voltage Vbias, and when an output voltage from vibration detector 270 is lower than lower limit value VL, vibration detector 270 is diagnosed as being abnormal. Upper limit value VU and lower limit value VL define a prescribed range for diagnosing whether or not vibration detector 270 is abnormal.

While vibration detector 270 is normal, an output voltage from vibration detector 270 is varied around voltage Vbias and included in the range defined by upper limit value VU and lower limit value VL. When an output voltage from vibration detector 270 is out of the range defined by upper limit value VU and lower limit value VL, vibration detector 270 is diagnosed as being abnormal. For example, when FET 274 of vibration detector 270 suffers from a closed failure (a short-circuited state) at time t1 as illustrated, an output voltage from vibration detector 270 may be lower than lower limit value VL. Although not shown in particular, when FET 274 suffers from an open failure, an output voltage from vibration detector 270 may exceed upper limit value VU. Abnormality of vibration detector 270 can thus be diagnosed based on whether or not an output voltage from vibration detector 270 is included in the prescribed range defined by upper limit value VU and lower limit value VL.

Figure 40:
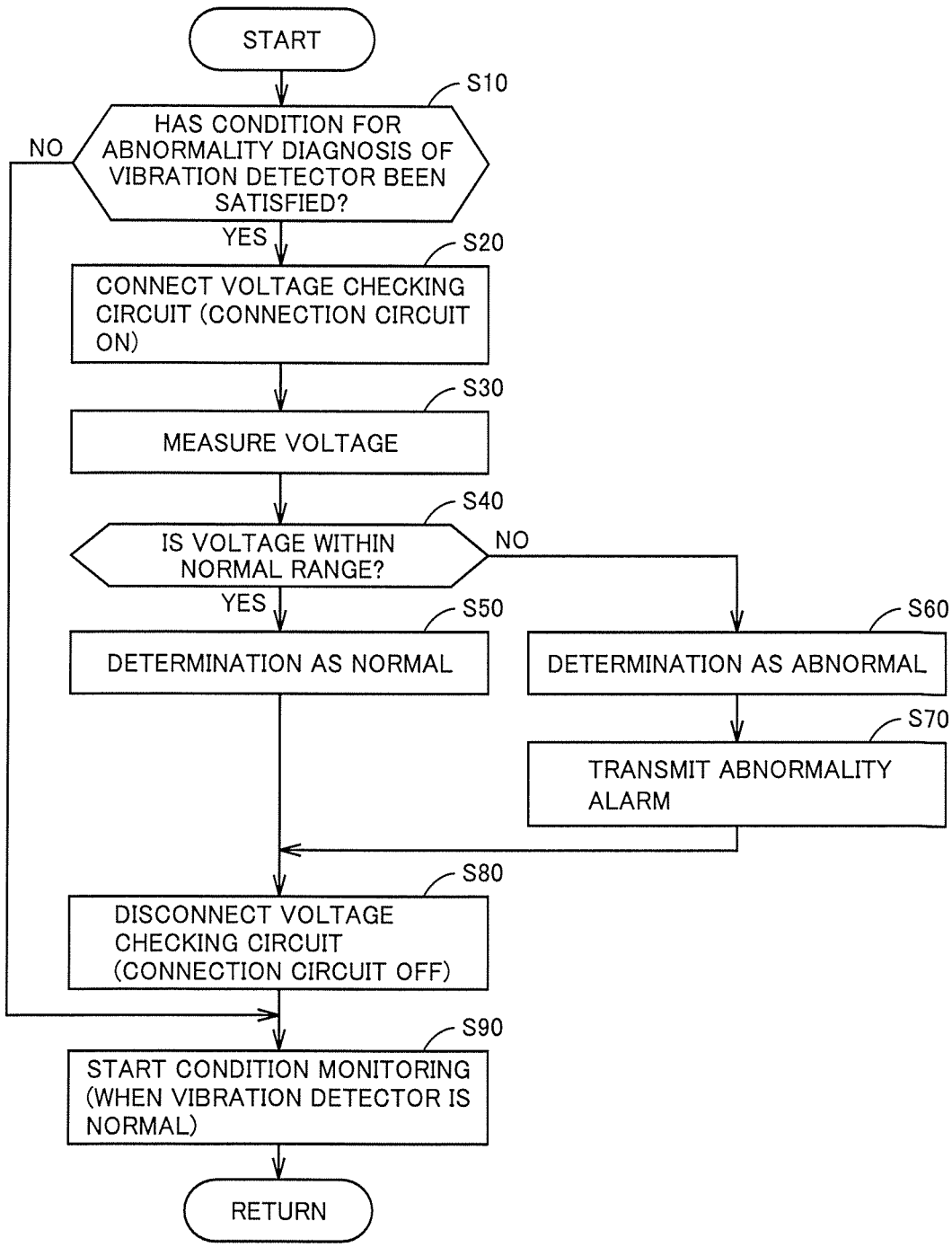
FIG. 40 is a flowchart illustrating a procedure in processing for diagnosing abnormality of the vibration detector.

FIG. 40 is a flowchart illustrating a procedure in processing for diagnosing abnormality of vibration detector 270. Referring to FIG. 40, CPU 428 determines whether or not a condition for abnormality diagnosis of vibration detector 270 has been satisfied (step S10). For example, a condition for abnormality diagnosis is considered as being satisfied at the time of start-up of the condition monitoring system including vibration detector 270 and data processing device 280 or each time of lapse of a prescribed period.

When it is determined that the condition for abnormality diagnosis is satisfied (YES in step S10), CPU 428 has the voltage checking circuit connected for checking an output voltage from vibration detector 270 (step S20). CPU 428 controls connection circuit 430 to be conducting (ON). Thus, output line 414 of vibration detector 270 is connected to input port P0 of A/D converter 426 without voltage processing circuit 416 being interposed. CPU 428 then measures the output voltage from vibration detector 270 based on a voltage input through input port P0 of A/D converter 426 (step S30).

CPU 428 determines whether or not a voltage measured in step S30 (an output voltage from vibration detector 270) is within a normal range (step S40). Specifically, CPU 428 determines whether or not a measured voltage is included in a prescribed range defined by upper limit value VU and lower limit value VL shown in FIG. 39.

When the voltage is determined as being within the normal range in step S40 (YES in step S40), CPU 428 determines vibration detector 270 as being normal (step S50). When the voltage is determined as not being within the normal range (NO in step S40), CPU 428 determines vibration detector 270 as being abnormal (step S60). Then, CPU 428 transmits an abnormality alarm for notification about abnormality of vibration detector 270 to a server on the ground (step S70).

Then, CPU 428 has the voltage checking circuit disconnected (step S80). CPU 428 controls connection circuit 430 to a disconnected state (OFF). When CPU 428 determines vibration detector 270 as being normal in step S50, CPU 428 starts monitoring of a condition based on an output from voltage processing circuit 416 (FIG. 38) (step S90). When vibration detector 270 is determined as being abnormal in step S60, condition monitoring above is not performed. In the third embodiment, abnormality of vibration detector 270 is diagnosed by activating the voltage checking circuit (connection circuit 430) before monitoring of a condition based on an output from voltage processing circuit 416.

As set forth above, in the third embodiment, connection circuit 430 for taking in an output from vibration detector 270 without voltage processing circuit 416 being interposed is provided. When an output voltage from vibration detector 270 received through connection circuit 430 is not included in a prescribed range including a bias voltage (Vbias), vibration detector 270 is diagnosed as being abnormal. Thus, according to the third embodiment, abnormality of the main body of vibration detector 270 can be diagnosed based on an output from vibration detector 270.

According to the third embodiment, abnormality of vibration detector 270 is diagnosed by activating connection circuit 430 before monitoring of a condition based on an output from voltage processing circuit 416. Therefore, monitoring of a condition based on an output from abnormal vibration detector 270 can be prevented.

Detailed Description of Fourth Embodiment

In the fourth embodiment, a plurality of vibration sensors are provided in nacelle 90 so that a condition of wind turbine 10B is monitored in further detail. A configuration for allowing diagnosis as to whether or not abnormality has occurred in each vibration sensor is shown.

Figure 41:
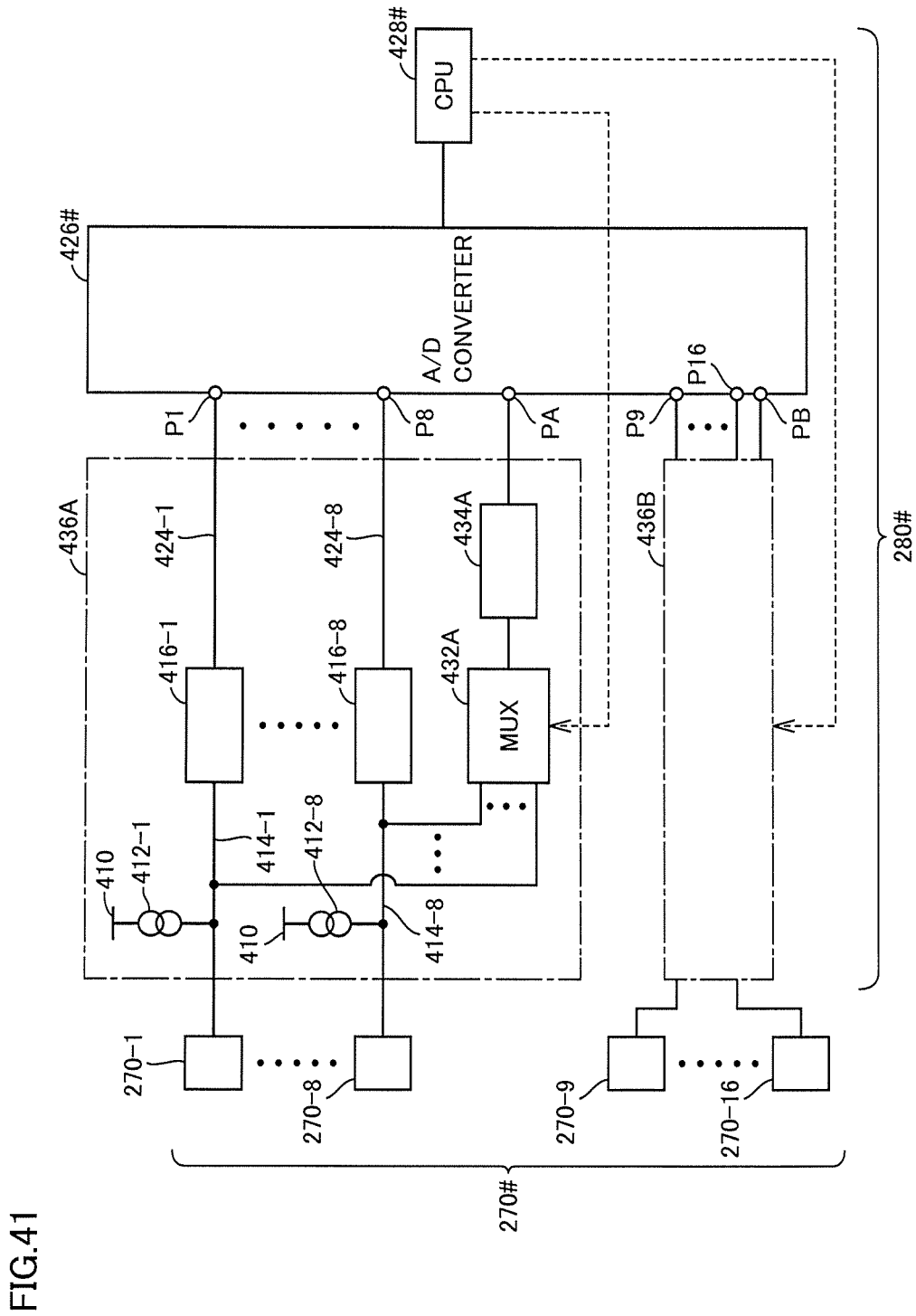
FIG. 41 is a diagram showing a configuration of a vibration detector and a data processing device in a fourth embodiment.

FIG. 41 is a diagram showing a configuration of a vibration detector 270# and a data processing device 280# in the fourth embodiment. Referring to FIG. 41, vibration detector 270# includes a plurality of vibration sensors provided in nacelle 90. By way of example, in the fourth embodiment, vibration detector 270# includes a plurality of vibration sensors 270-1 to 270-16. The plurality of vibration sensors 270-1 to 270-16 can detect not only vibration of bearing 60 but also various types of vibration of gearbox 40 and a gear therein or a rotation shaft of generator 50 or nacelle 90. Each of the plurality of vibration sensors 270-1 to 270-16 is basically the same in configuration to vibration detector 270 shown in FIG. 38.

Data processing device 280# includes a first processing circuit 436A, a second processing circuit 436B, an A/D converter 426#, and a CPU 428#. First processing circuit 436A includes DC power supply 410, constant current elements 412-1 to 412-8, voltage processing circuits 416-1 to 416-8, a multiplexer 432A, and various circuits 434A.

Each of constant current elements 412-1 to 412-8 is the same as constant current element 412 shown in FIG. 38 and each of voltage processing circuits 416-1 to 416-8 is the same as voltage processing circuit 416 shown in FIG. 38. By way of example, a constant current is supplied from constant current element 412-1 through an output line 414-1 to vibration sensor 270-1, and FET 274 (not shown) of vibration sensor 270-1 regulates a voltage level on output line 414-1 to a prescribed bias voltage, which is also applicable to others.

Multiplexer 432A is connected to each of output lines 414-1 to 414-8 and outputs any one of output lines 414-1 to 414-8 to various circuits 434A. Multiplexer 432A serves, together with various circuits 434A, as a voltage checking circuit for checking output voltages from vibration sensors 270-1 to 270-8. Multiplexer 432A is controlled by CPU 428# and sequentially connects output lines 414-1 to 414-8 to various circuits 434A while abnormality of vibration detector 270# is being diagnosed.

Various circuits 434A include a protection circuit and a stabilization circuit in order to take voltages on output lines 414-1 to 414-8 received through multiplexer 432A into A/D converter 426#.

Second processing circuit 436B is provided for a plurality of vibration sensors 270-9 to 270-16, and second processing circuit 436B is the same in configuration to first processing circuit 436A, although not illustrated in particular.

A/D converter 426# receives output voltages from voltage processing circuits 416-1 to 416-16 at respective input ports P1 to P16, converts voltages (analog signals) input through input ports P1 to P16 into digital signals, and outputs the digital signals to CPU 428#.

A/D converter 426# receives an output from multiplexer 432A through various circuits 434A at an input port PA, converts a voltage input through input port PA into a digital signal, and outputs the digital signal to CPU 428#. Similarly also in connection with second processing circuit 436B, A/D converter 426# receives an output from multiplexer 432B (not shown) through various circuits 434B (not shown) at an input port PB, converts a voltage input through input port PB into a digital signal, and outputs the digital signal to CPU 428#.

CPU 428# monitors various conditions of wind turbine 10B based on outputs from voltage processing circuits 416-1 to 416-16 taken in through A/D converter 426#. CPU 428# diagnoses abnormality of vibration detector 270# based on an output from vibration detector 270#. While abnormality of vibration detector 270# is being diagnosed, CPU 428# controls multiplexer 432A and multiplexer 432B of second processing circuit 436B in order to sequentially take in output voltages from vibration sensors 270-1 to 270-16 and sequentially diagnose abnormality of vibration sensors 270-1 to 270-16.

While abnormality of vibration detector 270# is being diagnosed, voltages on output lines 414-1 to 414-16 of vibration sensors 270-1 to 270-16 are sequentially taken into A/D converter 426# through multiplexers 432A and 432B without voltage processing circuits 416-1 to 416-16 being interposed. When the voltages on output lines 414-1 to 414-16 received through multiplexers 432A and 432B (output voltages from vibration sensors 270-1 to 270-16) are not included in a prescribed range including the bias voltage (Vbias), CPU 428# then diagnoses that vibration sensor as being abnormal.

By thus providing multiplexers 432A and 432B, connection circuit 430 as in the third embodiment shown in FIG. 38 does not have to be provided for each of voltage processing circuits 416-1 to 416-16. Though vibration sensors 270-1 to 270-16 are grouped into two (a group of vibration sensors 270-1 to 270-8 belonging to first processing circuit 436A and a group of vibration sensors 270-9 to 270-16 belonging to second processing circuit 436B) and a multiplexer is provided for each group in the above, it is not essential to group a plurality of vibration sensors into two. Such grouping does not have to be performed or sub grouping may be performed.

Figure 42:
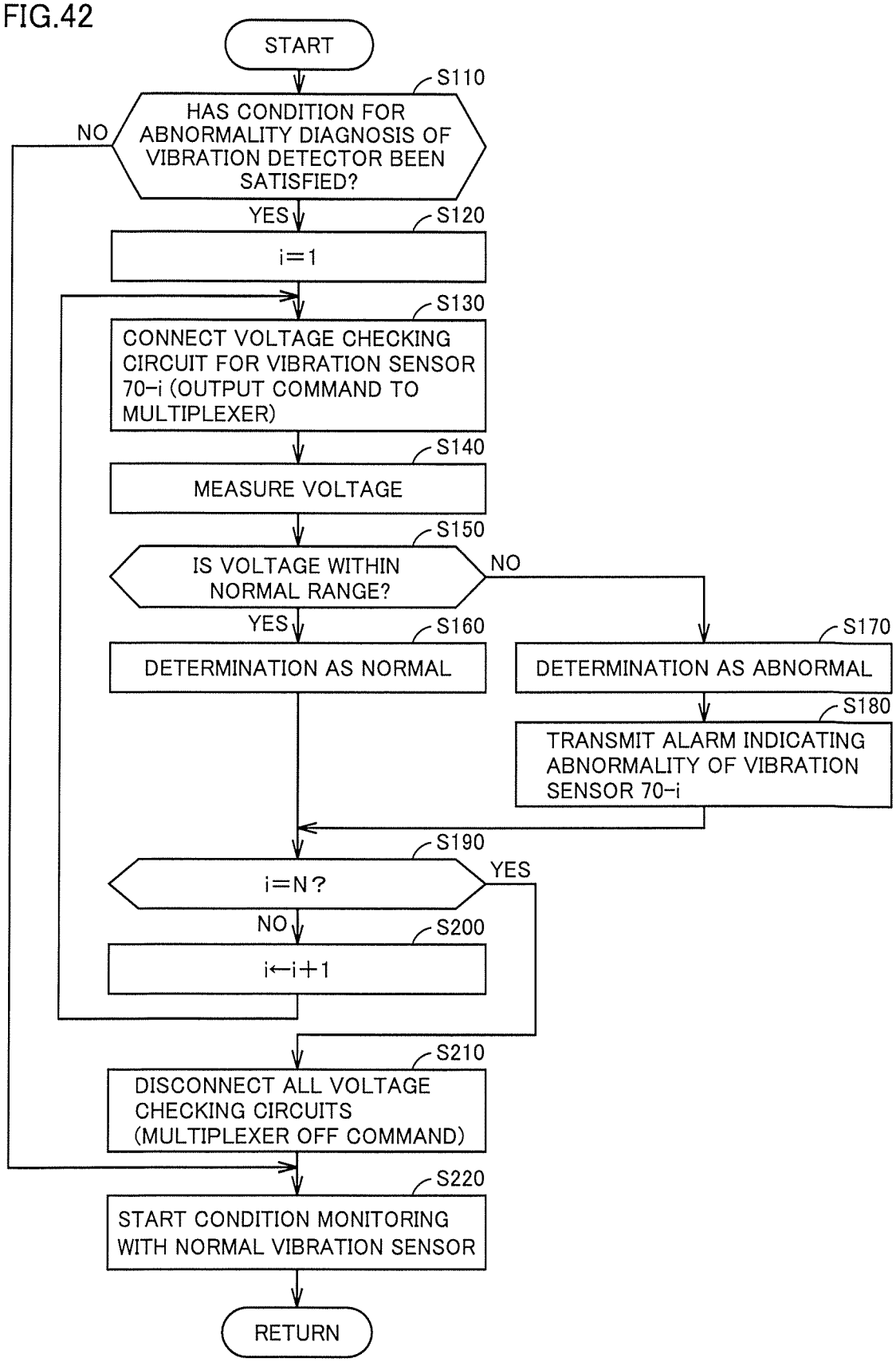
FIG. 42 is a flowchart illustrating a procedure in processing for diagnosing abnormality of the vibration detector in the fourth embodiment.

FIG. 42 is a flowchart illustrating a procedure in processing for diagnosing abnormality of vibration detector 270# in the fourth embodiment. Referring to FIG. 42, CPU 428# determines whether or not a condition for abnormality diagnosis of vibration detector 270# has been satisfied (step S110). Processing performed in step S110 is basically the same as processing performed in step S10 shown in FIG. 40.

When it is determined that the condition for abnormality diagnosis has been satisfied in step S110 (YES in step S110), CPU 428# substitutes 1 into a counter i (step S120). Then, CPU 428# has the voltage checking circuit connected for checking an output voltage from a vibration sensor 270-$i$ (i representing a counter value) (step S130). CPU 428 controls multiplexers 432A and 432B such that an output of vibration sensor 270-$i$ is connected to various circuits 434 (in the fourth embodiment, various circuits 434A when a condition of i≤8 is satisfied and various circuits 434B when a condition of i≥9 is satisfied).

Then, CPU 428# measures an output voltage from vibration sensor 270-$i$ based on a voltage input through input port PA or PB of A/D converter 426# (step S140). CPU 428# determines whether or not a voltage measured in step S140 (an output voltage from vibration sensor 270-$i$) is within a normal range (step S150). Specifically, CPU 428# determines whether or not a measured voltage is included in a prescribed range defined by upper limit value VU and lower limit value VL shown in FIG. 39.

When the voltage is determined as being within the normal range in step S150 (YES in step S150), CPU 428# determines vibration sensor 270-$i$ as being normal (step S160). When the voltage is determined as not being within the normal range (NO in step S150), CPU 428# determines vibration sensor 270-$i$ as being abnormal (step S170). Then, CPU 428# transmits an abnormality alarm for notification about abnormality of vibration detector 270-$i$ to a server on the ground (step S180).

Then, CPU 428# determines whether or not counter i has reached N (N representing the number of vibration sensors, N=16 in the fourth embodiment) (step S190). When counter i has not reached N (NO in step S190), CPU 428# increments counter i by one (step S200) and the process returns to step S130.

When counter i is determined as having reached N in step S190 (YES in step S190), CPU 428# has all voltage checking circuits disconnected (step S210). CPU 428# controls multiplexers 432A and 432B such that outputs of all vibration sensors 270-$i$ are disconnected from various circuits 434A and 434B.

Then, CPU 428# starts monitoring of a condition of the vibration sensor determined as being normal in step S160, based on an output from corresponding voltage processing circuit 416 (FIG. 41) (step S220).

As set forth above, in the fourth embodiment, multiplexers 432A and 432B are provided. While abnormality of vibration detector 270# is being diagnosed, outputs of a plurality of vibration sensors 270-1 to 270-16 are sequentially connected to the input port of A/D converter 426#. Therefore, according to the fourth embodiment, connection circuit 430 as in the third embodiment does not have to be provided for each of voltage processing circuits 416-1 to 416-16. Abnormality of each of the plurality of vibration sensors 270-1 to 270-16 can be diagnosed with the number of input ports of A/D converter 426# also being suppressed.

As set forth above, the third and fourth embodiments include the disclosure as below.

(Configuration 11)

A condition monitoring system that monitors a condition of facilities by measuring vibration of the facilities, the condition monitoring system comprising:

a vibration detector that outputs vibration detected by sensing of an acceleration generated in the facilities as voltage variation from a bias voltage;

a voltage processing circuit that removes the bias voltage from an output voltage from the vibration detector;

a monitoring apparatus that monitors a condition of the facilities based on an output from the voltage processing circuit; and a connection circuit that connects an output of the vibration detector to the monitoring apparatus without the voltage processing circuit being interposed, the monitoring apparatus diagnosing the vibration detector as being abnormal when the output voltage received through the connection circuit is not included in a prescribed range including the bias voltage.

(Configuration 12)

The condition monitoring system described in configuration 11, in which the connection circuit includes a relay connected in parallel to the voltage processing circuit, and the monitoring apparatus controls the relay to be conducting while abnormality of the vibration detector is being diagnosed.

(Configuration 13)

The condition monitoring system described in configuration 11, in which the vibration detector includes a plurality of vibration sensors, the connection circuit includes a multiplexer that connects any one of outputs of the plurality of vibration sensors to an input port of the monitoring apparatus, and the monitoring apparatus controls the multiplexer such that the outputs of the plurality of vibration sensors are sequentially connected to the input port while abnormality of the vibration detector is being diagnosed.

(Configuration 14)

The condition monitoring system described in configuration 11, in which the monitoring apparatus diagnoses abnormality of the vibration detector by activating the connection circuit before monitoring of a condition based on an output from the voltage processing circuit.

(Configuration 15)

A wind turbine comprising the condition monitoring system described in any one of configurations 11 to 14.

The disclosure in the present third and fourth embodiments can be combined with the disclosure in the first embodiment. The wind turbine in the first embodiment may further include vibration detector 270 in the third embodiment as condition monitoring sensor 70 shown in FIG. 1 and data processing device 280 in the third embodiment. Vibration detector 270 outputs the detected vibration data to data processing device 80 and data processing device 280. Alternatively, the wind turbine in the first embodiment may further include vibration detector 270# in the fourth embodiment as condition monitoring sensor 70 shown in FIG. 1 and data processing device 280# in the fourth embodiment. Vibration detector 270# outputs the detected vibration data to data processing device 80 and data processing device 280#. A criterion value for accurately determining whether or not abnormality has occurred in an object can thus be calculated and abnormality of a main body of the vibration detector can be diagnosed based on an output from vibration detector 270 (or vibration detector 270#).

It should be understood that the embodiments disclosed herein are illustrative and non-restrictive in every respect. The scope of the present invention is defined by the terms of the claims rather than the description of the embodiments above and is intended to include any modifications within the scope and meaning equivalent to the terms of the claims.

REFERENCE SIGNS LIST 10, 10A, 10B wind turbine; 20 main shaft; 25 hub; 30 blade; 40 gearbox; 50 generator; 60, 60# main shaft bearing; 70 condition monitoring sensor; 80 data processing device; 90 nacelle; 95 terminal device; 96 storage; 97 display; 98 selector; 100 tower; 101 filter; 102 frequency analyzer; 103 peak detector; 104 map generator; 105 abnormal peak extractor; 106 first criterion value calculator; 107 database; 108 abnormal part estimator; 109 second criterion value calculator; 110 output processor; 170 vibration detector; 180 data processing device; 210 inner ring; 220 outer ring; 230 rolling element; 240 damage; 270, 270# vibration detector; 270-1 to 270-16 vibration sensor; 272 piezoelectric element; 274 FET; 280, 280# data processing device; 310 receiver; 320 LPF; 330 phase information obtaining unit; 340 rotation speed detector; 350 HPF; 360 frequency analyzer; 370 condition monitoring unit; 410 DC power supply; 412 constant current element; 414 output line; 416 voltage processing circuit; 418 capacitor; 420 amplifier; 422, 434A, 434B various circuits; 426, 426# A/D converter; 428, 428# CPU; 430 relay; 432A, 432B multiplexer; P1 to P16, PA, PB input port

The invention claimed is:

1. A condition monitoring apparatus that monitors a condition of an object, the condition monitoring apparatus comprising:

a CPU; and a non-transitory memory storing a program, wherein the program, when executed by the CPU, causes the CPU to perform:

detecting one or more peaks from a frequency spectrum obtained by frequency analysis of waveform data measured by a sensor provided in the object;

generating one or more abnormality maps for the frequency spectrum, wherein the one or more abnormality maps each include abnormal components comprising a frequency of one peak of interest selected from among detected peaks and one or more frequencies of one or more peaks that appear together with the peak of interest when the peak of interest is assumed as a peak originating from abnormality of the object, wherein the one or more abnormality maps include information where the frequency and a value 0 or 1 are associated with each other for each frequency, a value corresponding to a frequency of each of the abnormal components is set to 1, and a value corresponding to a frequency not defined as the abnormal components is set to 0;

selecting one map of interest from the one or more abnormality maps, and extracting one or more abnormal peaks from the detected peaks, wherein the one or more abnormal peaks correspond to one or more peaks, and a difference between a frequency of each of one or more abnormal peaks and a frequency of any of the abnormal components included in the map of interest is equal to or smaller than a prescribed value; and calculating, based on a spectral density of the one or more abnormal peaks, a first criterion value representing occurrence of abnormality corresponding to the map of interest.

2. The condition monitoring apparatus according to claim 1, wherein:
the frequency spectrum is expressed by a data sequence in which unit data where a frequency and a spectral density at the frequency are associated with each other are arranged sequentially in accordance with the frequency, and
in the detecting one or more peaks, unit data having a spectral density exhibiting a relative maximum value and exceeding a first threshold value are detected from the data sequence.

3. The condition monitoring apparatus according to claim 2, wherein
in the detecting one or more peaks, the first threshold value that is constant regardless of the frequency is set based on the frequency spectrum.

4. The condition monitoring apparatus according to claim 2, wherein
in the detecting one or more peaks, the first threshold value varied in accordance with the frequency is set based on the frequency spectrum.

5. The condition monitoring apparatus according to claim 2, wherein
the one or more abnormal peaks are extracted by subjecting the unit data detected as the one or more peaks and the map of interest to a logical AND process to mask a peak at a frequency not defined as the abnormal components.

6. The condition monitoring apparatus according to claim 1, wherein:
the one or more abnormality maps include at least one of a first abnormality map, a second abnormality map, or a third abnormality map,
in the first abnormality map, with a frequency of the peak of interest being defined as a fundamental frequency, the fundamental frequency and one or more frequencies of one or more harmonics of a fundamental wave having the fundamental frequency are defined as the abnormal components,
in the second abnormality map, the fundamental frequency, one or more frequencies of one or more sideband waves of the fundamental wave, a frequency of the harmonic one or more frequencies of one or more harmonics of the fundamental wave, and one or more frequencies of one or more sideband waves of the one or more harmonics are defined as the abnormal components, and
in the third abnormality map, a frequency included in a prescribed frequency band including the frequency of the peak of interest is defined as an abnormal component.

7. The condition monitoring apparatus according to claim 1, wherein
the first criterion value is a sum of spectral densities of the one or more abnormal peaks.

8. The condition monitoring apparatus according to claim 1, wherein
the first criterion value is a sum of values obtained by multiplying the spectral density of the one or more abnormal peaks by a weight coefficient in accordance with the frequency of the one or more abnormal peaks.

9. The condition monitoring apparatus according to claim 1, wherein:

the executed program further causes the CPU to perform:
extracting abnormal part information as identification information from a database, which stores, for each part of the object, the abnormal part information in which (i) part information for identifying the part, (ii) a frequency originating from abnormality of the part, and (iii) a second threshold value are associated with one another, wherein the identification information represents the frequency of which difference from the peak of interest corresponding to the map of interest is equal to or smaller than a prescribed value and represents the second threshold value smaller than the first criterion value corresponding to the map of interest, and
generating first estimation result information indicating that abnormality has occurred in a part identified by the part information in the identification information.

10. The condition monitoring apparatus according to claim 9, wherein
the executed program further causes the CPU to perform, when the CPU is unable to extract the identification information for the map of interest and the first criterion value corresponding to the map of interest exceeds a third threshold value, generating second estimation result information indicating that abnormality not registered in the database has occurred.

11. The condition monitoring apparatus according to claim 10, wherein
the at least one abnormality map includes a plurality of abnormality maps,
the first criterion value calculator selects each of the plurality of abnormality maps sequentially as the map of interest and calculates the first criterion value for each of the plurality of abnormality maps, and
the executed program further causes the CPU to perform calculating, as a second criterion value, a sum of the first criterion value in the map of interest for which identification information has been extracted and the first criterion value in the map of interest for which identification information has not been extracted and in which the corresponding first criterion value exceeds the third threshold value.

12. The condition monitoring apparatus according to claim 9, wherein
the one or more abnormality maps include a plurality of abnormality maps,
in the calculating the first criterion value, each of the plurality of abnormality maps is sequentially selected as the map of interest and the first criterion value for each of the plurality of abnormality maps is calculated, and
the condition monitoring apparatus further comprises a second criterion value calculator that calculates as a second criterion value, a sum of the first criterion values in the map of interest for which identification information has been extracted.

13. The condition monitoring apparatus according claim 1, wherein:
the one or more abnormality maps include two or more abnormality maps generated for the peak of interest based on two or more abnormality models different from each other in how an abnormal component appears,
the executed program further causes the CPU to perform:
extracting abnormal part information as identification information from a database, which stores, for each part of the object, the abnormal part information in which (i) model information for identifying an abnormality model, (ii) part information for identifying the part, (iii) a frequency originating from abnormality of the part, and (iv) a second threshold value are associated with one another, wherein the identification information represents the model information for identifying the abnormality model corresponding to the map of interest, representing the frequency of which difference from the peak of interest corresponding to the map of interest is equal to or smaller than a prescribed value, and represents the second threshold value smaller than the first criterion value corresponding to the map of interest, and generating first estimation result information indicating that abnormality has occurred in a part identified by the part information in the identification information.

14. The condition monitoring apparatus according to claim 1, further comprising:
a vibration detector that includes the sensor and measures vibration of a rotating body that rotates around a rotation axis while a direction of the rotation axis is not vertical, the vibration detector being fixed to the rotating body and wirelessly outputting vibration data detected by sensing an acceleration; and
a controller configured to obtain at least one of rotation phase information and a rotation speed of the rotating body based on a variation component in the vibration data that is varied with a rotation period of the rotating body as the vibration detector is affected by gravity.

15. A condition monitoring system comprising:
the condition monitoring apparatus according to claim 1; and
a terminal device, wherein
the terminal device shows a graph of the frequency spectrum on a display.

16. The condition monitoring system according to claim 15, wherein
the terminal device shows a portion of the one or more abnormal peaks in the frequency spectrum corresponding to the map of interest in a display format different from a display format for a remaining portion.

17. The condition monitoring system according to claim 15, wherein
the terminal device removes the one or more abnormal peaks in the frequency spectrum corresponding to the map of interest.

18. The condition monitoring system according to claim 15, wherein
the terminal device shows only the one or more abnormal peaks in the frequency spectrum corresponding to the map of interest.

19. A condition monitoring system that is provided with the condition monitoring apparatus according to claim 1 and monitors a condition of facilities by measuring vibration of the facilities, the condition monitoring system comprising:
a vibration detector that includes the sensor and outputs vibration detected by sensing an acceleration generated in the facilities as voltage variation from a bias voltage;
a voltage processing circuit that removes the bias voltage from an output voltage of the vibration detector;
a monitoring apparatus that monitors a condition of the facilities based on an output from the voltage processing circuit; and
a connection circuit that connects an output of the vibration detector to the monitoring apparatus without the voltage processing circuit being interposed, wherein
the monitoring apparatus diagnoses the vibration detector as being abnormal when the output voltage received through the connection circuit is not within a prescribed range including the bias voltage.

20. A condition monitoring method of monitoring a condition of an object, the condition monitoring method comprising:
detecting one or more peaks from a frequency spectrum obtained by frequency analysis of waveform data measured by a sensor provided in the object;
generating one or more abnormality maps for the frequency spectrum, wherein
the one or more abnormality maps each include abnormal components comprising a frequency of one peak of interest selected from detected peaks and one or more frequencies of one or more peaks that appear together with the peak of interest when the peak of interest is assumed as a peak originating from abnormality of the object, wherein the one or more abnormality maps include information where the frequency and a value 0 or 1 are associated with each other for each frequency, a value corresponding to a frequency of each of the abnormal components is set to 1, and a value corresponding to a frequency not defined as the abnormal components is set to 0;
selecting one map of interest from among the one or more abnormality maps and extracting one or more abnormal peaks from the detected peaks, wherein the one or more abnormal peaks correspond to one or more peaks, and a difference between a frequency of each of one or more abnormal peaks and a frequency of any of the abnormal components included in the map of interest is equal to or smaller than a prescribed value; and
calculating, based on a spectral density of the one or more abnormal peaks, a first criterion value representing occurrence of abnormality corresponding to the map of interest.

* * * * *